United States Patent [19]

Berni

[11] Patent Number: 5,317,383
[45] Date of Patent: May 31, 1994

[54] ARRAY RETROREFLECTOR APPARATUS FOR REMOTE SEISMIC SENSING

[75] Inventor: Albert J. Berni, Houston, Tex.

[73] Assignee: Shell Oil Company, Houston, Tex.

[21] Appl. No.: 946,729

[22] Filed: Sep. 18, 1992

[51] Int. Cl.[5] ............................................. G01B 9/02
[52] U.S. Cl. ....................................... 356/351; 356/72;
356/349; 356/364; 367/14; 367/15; 73/624;
73/627; 73/784; 73/800; 181/112; 181/122
[58] Field of Search ................ 356/72, 349, 351, 364;
367/14, 15, 20, 32, 36, 37; 73/624, 627, 628,
767, 784, 800; 181/112, 122

[56] References Cited

U.S. PATENT DOCUMENTS

| | | |
|---|---|---|
| 3,656,853 | 4/1972 | Bagley et al. |
| 4,284,350 | 8/1981 | Coon et al. |
| 4,353,650 | 10/1982 | Sommargren |
| 4,456,339 | 6/1984 | Sommargren |
| 4,594,003 | 6/1986 | Sommargren |
| 4,606,638 | 8/1986 | Sommargren |
| 4,687,958 | 8/1987 | Sommargren |
| 4,688,940 | 8/1987 | Sommargren et al. |
| 4,746,216 | 5/1988 | Sommargren |
| 4,802,763 | 2/1989 | Young et al. |
| 4,818,100 | 4/1989 | Breen |
| 4,834,111 | 5/1989 | Khanna et al. |
| 4,859,066 | 8/1989 | Sommargren |
| 4,950,078 | 8/1990 | Sommargren |
| 5,070,483 | 12/1991 | Berni |
| 5,109,362 | 4/1991 | Berni |

FOREIGN PATENT DOCUMENTS

| | | |
|---|---|---|
| WO91/13373 | 9/1991 | PCT Int'l Appl. |
| 1173772 | 12/1969 | United Kingdom |
| 1513249 | 6/1978 | United Kingdom |
| 1605217 | 8/1984 | United Kingdom |
| 2173064 | 10/1986 | United Kingdom |
| 2183956 | 6/1987 | United Kingdom |

Primary Examiner—Samuel A. Turner
Assistant Examiner—LaCharles P. Reesce
Attorney, Agent, or Firm—Fred S. Reynolds, Jr.

[57] ABSTRACT

A remote sensing system is provided which operates as a bipolarized, differential mode, LDI (laser differential interferometry) system to detect an electrical signal produced at a remote location. The system is adapted to reduce the effects of turbulence induced frequency fluctuations by using an array retroreflector apparatus which converts a single sensing beam into a single return beam having two, overlapping, transversely polarized sensing signals; thus, turbulence induced noise will be common mode to both return signals and cancel at the receiver.

In preferred embodiments, the system is used to remotely detect an amplified array signal from a plurality of seismic detectors (e.g., geophones or hydrophones) connected to form an array at the remote location. The target is coupled to common motions at the selected location and the amplified array signal is coupled to an optical component within the target. The target converts the sensing beam into a return beam by separating from the sensing beam two transversely polarized sensing signals, by Doppler shifting the sensing signals to have frequency components that represent common motions coupled to the array retroreflector and to contain between the signals a difference signal which represents the array signal. The target also combines the two sensing signals into a single return beam having two transversely polarized return sensing signals. The return beam is detected. The return sensing signals are separated from the return beam and combined by electronic and/or by optical heterodyning techniques to cancel any common mode signals on the sensing and return beam, thereby leaving a frequency modulated difference signal which represents the frequency modulated array signal. The frequency modulated difference signal may then be demodulated to produce a time varying signal which represents the seismic signal of the seismic motions detected by the seismic detectors.

85 Claims, 5 Drawing Sheets

ARRAY RETROREFLECTOR APPARATUS FOR REMOTE SEISMIC SENSING

FIELD OF THE INVENTION

This invention relates to remote detection systems which use laser Doppler interferometry techniques to detect motion with electromagnetic waves, and more particularly, to laser Doppler interferometry techniques used in seismic surveying to detect ground motions which represent seismic signals.

BACKGROUND OF THE INVENTION

It is generally the objective of seismic exploration to generate seismic energy, make measurements of and record the amplitude of any reflected and refracted energy at selected locations and for selected times, and then by selectively processing the recorded seismic data, to deduce the geometry of the subsurface geologic boundaries as well as some properties of the materials of the earth through which the seismic energy has propagated and from which it has been reflected.

Conventional land seismic acquisition techniques involve the use of an appropriate source (dynamite, vibrator(s), airguns(s), etc.) to generate seismic energy and a set of detectors, spread out on the surface of the earth, to detect any seismic signals due to seismic energy interacting with subsurface geologic boundaries. These detected signals are recorded as a function of time and subsequent processing of these signals, i.e., seismic "traces" or seismic data, is designed to reconstruct an appropriate image of the geologic boundaries of the subsurface and to obtain information about the subsurface materials. In simplistic terms this conventional acquisition process has a seismic wave, from a source of seismic energy, traveling down into the earth, reflecting from a particular geologic interface (i.e., a change or contrast in elastic constants, velocities, and/or densities), and returning to the surface, where the seismic wave may be detected by an appropriate detector, or detectors.

Conventionally, the detector employed to detect seismic signals on land is a geophone. A geophone is an electro-mechanical device that is coupled to the ground via an extension or "spike" that is physically inserted into the ground. This allows the geophone case to vibrate because of any earth motions, including seismic signals. Internal to the geophone case and vibrationally isolated from the case (typically by springs) is an "inertial" mass that does not vibrate with the earth. Thus, there is a small relative motion between the geophone case and its inertial mass due to any detected ground motions. This relative motion is converted to an electrical signal by having a coil of wire that moves through an electromagnetic field of a permanent magnet; the magnet may be the inertial mass with the coil attached to the geophone case, or vice versa. This electrical signal is the seismic signal that is recorded (alone, or more preferably, in combination with other electrical signals) and later processed.

Seismic field layouts vary with the exploration objective sought to be detected. However, there is usually a need to simultaneously record seismic motion at many ground positions spaced over a wide area. A seismic line usually consists of multiple detector stations with each detector station having several geophones whose output signals are combined to form a single signal (array signal) for the detector station. The geophones are arranged in an array to reject unwanted waves while enhancing the reception of desired seismic waves on the electrical signals.

The signals from these arrays (detector stations) are collected and recorded for each seismic shot (seismic energy source). Conventional land seismic data acquisition is slow, expensive and labor intensive. In particular, the activity of laying out a cable which interconnects the detector stations, so that the array electrical signals may be recorded, is time consuming and requires a substantial work force. It would be desirable to have a fast way to move the entire seismic line or portions thereof and thereby minimize survey time.

A radar system which senses seismic ground motion (vibrations) remotely is one solution for reducing the cost and time for acquiring seismic data. Two such systems are described in U.S. Pat. Nos. 5,070,483, Remote Seismic Sensing, and 5,109,362, Remote Seismic Sensing. Both patents use laser Doppler heterodyne interferometry techniques to detect the movements of the earth.

Another laser Doppler interferometry system is described in U.S. Pat. No. 4,284,350, Laser Geophone, which uses a homodyne system with a detector having side-by-side corner-cube retroreflectors for detecting vertical ground motions at a remote location. The use of a single or a side by side corner-cube retroreflector arrangement is also suggested for some detectors in embodiments of the heterodyne systems described in the before mentioned U.S. Pat. Nos. 5,070,483 and 5,109,362.

However, these systems require at least one sensing beam and return beam for each detector (geophone equivalent). An array may have as many as 32 geophones for each detector station and a seismic line may have a hundred or more detector stations. If 3-D detection is desired, there could be many additional seismic lines. The number of sensing and return beams necessary to acquire this data by a remote sensing system could be substantially reduced if only one sensing beam and return beam are used for each detector station.

In addition, some of the prior art remote sensing detectors of the before mentioned patents feature detectors which have side-by-side retroreflector configurations. In theory, the use of a side-by-side retroreflector detector requires that two approximately side-by-side sensing beams be sent to a detector where at least one of the beams is Doppler shifted (frequency modulated) by seismic motions coupled to the detector. The two modulated sensing beams may contain approximately identical Doppler shifted frequency components (common mode signals) which represent seismic motions common to the Doppler shifting optical components on the detector (assuming that both beams were Doppler shifted). Also, the modulated beams contain between them Doppler shifted frequency components (a difference signal) which represents the desired (or selected) seismic signal. When the modulated beams are combined electronically or by optical homodyning, the common mode signals cancel and the difference signal (the frequency components which are not common to both beams) remains. One problem with a homodyning system is that it is not possible to determine "up" Doppler and "down" Doppler motion from the obtained difference signal. This problem is resolved by using a heterodyning system instead. However, in spite of this problem, the difference signal provided by this prior art homodyning system does represent the vertical motions of the earth at the remote location.

The side-by-side corner-cube retroreflector configurations of the before mentioned designs, or any other type of side-by-side retroreflector design, necessarily require that two sensing beams travel different paths through the air to and from the retroreflectors. Separate air paths may have different effects upon the propagating laser sensing beams. Solar radiation heats the ground surface, causing convective air currents which break into turbulent flow. These randomly sized (roughly 1 millimeter to 1 meter) air packets have anomalous temperatures and refractive indices. The optical phase of each laser beam shifts as it passes through a region of anomalous refractive index. These air packets blow across the raypath and cause time-varying, random frequency modulation of the laser beam. Thus, two laser beams traveling through different air spaces will experience different fluctuations in each carrier frequency of the laser beams.

Since, the two laser beams are spatially separated, they will not be affected equally by the atmosphere and the atmospheric effects on the beams are not totally common mode signals. The atmospheric effects do not cancel completely when the two laser beams are combined electronically or by optical homodyning or heterodyning techniques. Thus, the difference signal will not only contain the desired Doppler signal but also an additional component which will be referred to herein as turbulent noise. Turbulent noise is especially prevalent on sunny, windy days. Consequently, if side by side retroreflectors are used as parts of the detector in a remote seismic sensing system, the presence of turbulent noise on the difference signal could prevent an accurate determination of the desired (or selected) ground motions (the desired Doppler signal).

Also, small seismic motions may not be detectable by the prior art systems. Each sensing beam is frequency modulated within the detectors when: it is incident normally on an optical component (such as a mirror, a retroreflector or a beamsplitter), it is reflected (or deflected) from its incident path by the optical component, and the optical component is moving relative to the incident path of the beam. The amount of Doppler shift at each point of reflection (deflection) is proportional to the relative velocity of the reflection point on the Doppler shifting optical component with respect to the incident path of the beam. As the beam is reflected through the detector, the Doppler shifts are cumulative; thus, the Doppler shifts add or subtract from the previous Doppler shifts on the beam. Upon exiting the detector, if the points of reflection on the combination of Doppler shifting optical components have undergone a net relative movement along the incident paths of the sensing beam, the cumulative movement of the reflection points would represent a net velocity with respect to the sensing beam. And, the sensing beam will be Doppler shifted (frequency modulated) by an amount which represents the net velocity of these reflection (deflection) points relative to the incident paths of the sensing beam. However, the seismic motion imposed upon the components which Doppler shift the sensing beam have relatively small amplitudes; thus, some seismic signals may not be detectable because of limitations, e.g., frequency drift and noise, in the homodyning or heterodyning and demodulation processes. If the amount of Doppler shift representing the difference signal could be increased, seismic signals having smaller amplitudes could be detected.

SUMMARY OF THE INVENTION

An object of this invention is to provide a remote sensing system which is adapted to provide a single array signal for each detector station.

Another object of this invention is to provide a remote sensing system which enhances the Doppler shift of an electrical signal by amplifying an electrical array signal.

An additional object of this invention is to provide a remote sensing system which is adapted to reduce turbulent noise on a sensing beam and a return beam.

Another object of this invention is to provide a remote sensing system which transmits a single sensing beam to illuminate a target (an array retroreflector apparatus), and receives from the target a single return beam having two polarized return sensing signals, one of the return sensing signals having frequency components which were produced by Doppler shifting the sensing signal with an array signal.

An additional object of this invention is to provide a target (an array retroreflector apparatus) which is functional (a) to be coupled to motions at a remote location (seismic as well as other motions such as wind induced motion), (b) to separate the sensing beam into two sensing signals, (c) to frequency modulate both of the sensing signals by Doppler shifting the signals to contain frequency components which represent common motions on the target, (d) to contain between the return signals a difference signal which represents an array signal, and (e) to combine the two sensing signals to form a return beam having two polarized return sensing signals.

A further object of this invention is to provide the target with the ability to align the two polarized return signals on the return beam such that the polarities of the signals are transverse to each other and the two signals overlap such that they share substantially the same air space on the return beam.

An additional object of this invention is to provide a method for a remote sensing system which uses a laser sensing beam and a return beam in such a manner that there is approximately no difference signal due to atmospheric effects placed on either the sensing beam or the return beam.

In accordance with the objects of the present invention, there is provided a remote sensing system which uses a differential mode LDI (laser differential interferometry) system. Although the description of the present invention in this specification emphasizes its use as a remote seismic sensing system to detect seismic traces from ground motions at a selected location (detector station), the invention may also be used for other remote sensing applications.

The differential mode LDI system of this invention uses an array retroreflector apparatus (target). The array retroreflector apparatus is connected to an array of geophones which are coupled to (seismic) motions at the detector station (a selected location). The motions coupled to the geophones produce an electrical signal on each geophone which represents the seismic motions. The electrical signals from the geophones are combined to form a combined electrical signal (an array signal). The array signal is coupled to an optical component of the target. The target converts a sensing beam into a return beam which has two transversely polarized overlapping return sensing signals, both of the sensing signals having been frequency modulated to contain frequency components that represent common motions on the target and to contain between the modulated signals a difference signal which represents a signal from an array of geophones. The return beam is then detected; return sensing signals are separated from the return beam; and then, the return sensing signals are combined by electronic and/or by optical homodyning or heterodyning techniques to cancel any common mode signals that were present on the sensing and return beam, thereby, leaving a difference signal which represents the geophone array's signal.

In one preferred embodiment of the array retroreflector apparatus, a casing is coupled to motions at the detector station and a polarizing beamsplitter is rigidly attached to the casing. When the beamsplitter is illuminated by an approximately horizontal sensing beam, the beam is split by the beamsplitter into two polarized sensing signals, a first and a second polarized sensing signal. The polarity of the first sensing signal is orthogonal with respect to the polarity of the second sensing signal. The beamsplitter is aligned to Doppler shift and to deflect the first polarized signal downward along a vertical ordinate to encounter a first corner-cube retroreflector. The first retroreflector is coupled to the casing through its mounting on a transducer. The transducer causes the retroreflector to move vertically in response to an electrical signal (an amplified array signal) coupled to the transducer which is representative of the combined geophone electrical signals of the array. The first retroreflector Doppler shifts and reflects the first polarized sensing signal back into the beamsplitter, which again Doppler shifts and deflects the signal.

Each time the beamsplitter deflects the first polarized sensing signal, the first signal is Doppler shifted to have frequency components which represent some of the motions that are coupled to the beamsplitter through the casing. These casing motions may include vertical and inline motions due to seismic motions or wind effects. The first time the first polarized sensing signal is deflected, the beamsplitter Doppler shifts the signal to produce a grouping of frequency components which represent vertical and horizontal-inline motions coupled to the beamsplitter. At the first retroreflector, Vertical motions of the retroreflector results in frequency modulating the first grouping of frequency components by Doppler shifting them to produce a second grouping of frequency components; these vertical motions include the vertical casing motions coupled to the retroreflector through the transducer and the amplified array signal. This second grouping of frequency components is again frequency modulated at the beamsplitter to produce a third grouping of frequency components when the first polarized sensing signal is deflected by the beamsplitter to its return propagation path. The deflected signal becomes a first return sensing signal. The third grouping of frequency components on the first return sensing signal includes the effects of the Doppler shifts produced by vertical and horizontal-inline motions on the beamsplitter at the time the signal returned to the beamsplitter.

The cumulative Doppler shift for the first polarized sensing signal is represented by the third grouping of frequency components and it includes the effect of the beamsplitter and the first retroreflector having opposite relative motions with respect to the beam. Consequently, the Doppler shifts imposed on the signal for vertical motions coupled through the casing to the beamsplitter and the retroreflector cancel; thus, the first return sensing signal has Doppler shifted frequency components which represent the array signal and inline motions.

The second polarized sensing signal passes through the beamsplitter to encounter a second corner-cube retroreflector which is rigidly attached to the casing. In reflecting this signal back into the beamsplitter, the second retroreflector Doppler shifts the second polarized sensing signal to have frequency components which represent horizontal-inline motions (seismic as well as wind induced motions) coupled to the retroreflector through the casing.

The reflected path of the second polarized sensing signal is aligned with the return propagation path of the first return sensing signal. When the reflected second polarized sensing signal returns to the beamsplitter, it becomes a second return sensing signal. The second return sensing signal has frequency components which represent the horizontal-inline motions.

The first and second return sensing signals are combined in the beamsplitter to form a return beam. The return beam is a transversely polarized beam in which the two return sensing signals substantially overlap so that the sensing signals are exposed to the same air space on the return trip to the receiver.

After detection, in preferred embodiments, through a heterodyne process, the common mode signals (the horizontal-inline motions on the return beam, as well as an other common mode signal which may have been added to the sensing beam or the return beam such as turbulent noise) are canceled, leaving a frequency modulated difference signal which represents the difference signal (the array signal). The difference signal can then be frequency demodulated to provide a time varying signal (amplitude modulated signal), e.g., a seismic trace, which represents the combined electrical signals detected by the geophones at the selected detector station.

These and other objects and advantages of the present invention will no doubt become apparent to those of skill in the art after having read the following detailed description of the preferred embodiments which are contained herein and illustrated by various figures.

The invention encompasses the heretofore described preferred embodiments as well as the embodiments as are described hereinafter and as will be apparent to those of skill in the art.

DETAILED DESCRIPTION OF THE PREFERRED EMBODIMENTS

The invention is a radar system which remotely senses motion by a bipolarized, differential mode, laser Doppler interferometry (LDI) remote sensing system. The radar system could be either airborne or ground based. The remote sensing system includes a sensing beam generation and transmission system, a remote detector apparatus referred to herein as an array retroreflector apparatus (target), and a receiver which includes a return beam detection system, a homodyning or heterodyning system and a demodulation system. However, in preferred embodiments, the receiver uses a heterodyning system. The remote sensing system is described herein for remotely detecting an array signal at a detector station (a remote or a selected location). However, it should be understood that a plurality of the described embodiments of this invention will provide for remotely detecting array signals at many detector stations simultaneously.

Also, the target with its related subsystems, e.g., an array of geophones, an amplifier and connecting cable, are referred to herein as a geolight system. The array of geophones may detect vertical, crossline or inline motions. The geolight system may also use other types of seismic detectors in the array and/or be used in water covered areas, for example, the related subsystems may include, an array of hydrophones which feed an amplified array signal to an array retroreflector apparatus which floats, or the array may include a bottom marine cable having geophones or hydrophones which provide an array signal to the floating array retroreflector apparatus. Other arrangements are also possible for the geolight system, such as, combinations of geophones and hydrophones to make up the array.

In addition, this invention is not limited to the detection of an array signal from the geolight system. Any electrical signal which may be coupled to the embodiments presented herein of the array retroreflector apparatus may be detected by the use of this invention.

Figure 1:
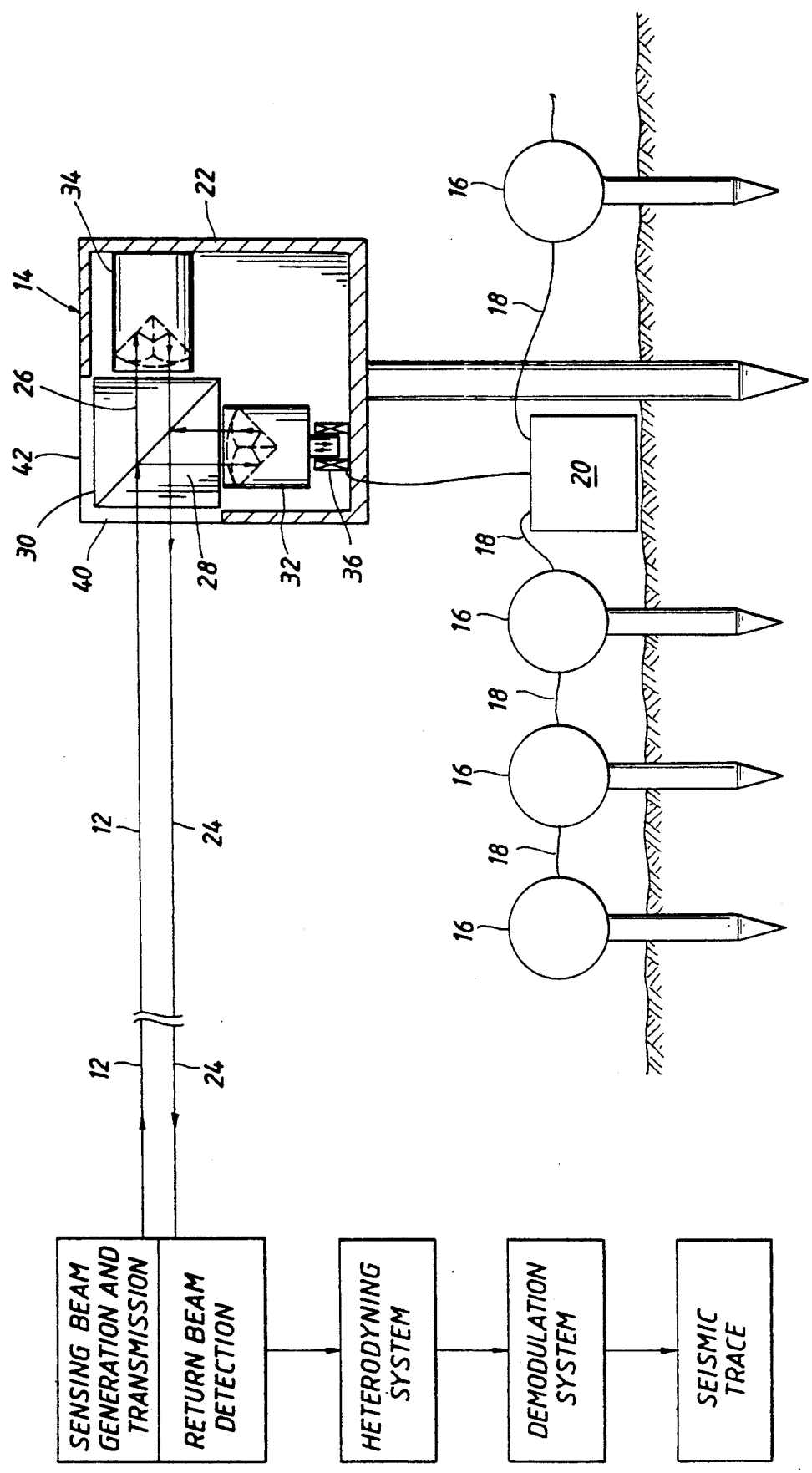
FIG. 1 is general layout and simplified block diagram of the remote sensing system of this invention, the general layout including a side view of one embodiment of an array retroreflector apparatus.

In preferred embodiments of the present invention, methods and apparatus are provided for remotely sensing an array signal which represents seismic vibrations at the earth's surface. However, as mentioned, embodiments of this inventions may also be used on water covered earth surfaces. Referring to FIG. 1, the figure depicts a general layout and simplified block diagram of one preferred embodiment of the remote sensing system of this invention. The radar system uses a continuous wave (CW) or pulsed laser beam to provide a transmitted sensing beam 12 which illuminates an array retroreflector apparatus (target) 14 at a detector station where an array signal is to be detected. Preferably, the sensing beam 12 has a substantially monochromatic frequency. Geophones 16 are arranged at the ground station in an optimum array pattern for the seismic signals to be detected and are shown connected by cables 18 to obtain a single array signal for the ground station. The cables 18 in turn may be connected to an amplifier, 20. Preferably, the amplifier will provide for a gain of at least 30 dB (decibels) in the power of the combined geophone electrical signals (the array signal). The increase in the power of the array signal, increases the amplitude of the array signal.

The target 14 does not have to be located at any specific location within the area of the detector station. It may be moved to avoid obstacles within the line of sight of the sensing beam. The array retroreflector apparatus 14 may also be mounted as at an elevation above the ground to be above local obstacles so that it is within line of sight of the sensing beam transmitter or it may be mounted closer to the ground if there are no local obstacles. The ability to move the target 14 to a convenient location is an advantage over prior art detectors. Whereas, the positioning of prior art remote detectors was somewhat dependent upon the array configuration needed at that particular detector station and not upon the most convenient location to intercept the sensing beam.

The array retroreflector apparatus 14 has a casing 22 which is coupled to motions at the detector station. These motions may include seismic and wind induced motions, or in the case of a floating array retroreflector, wave induced motions. These local motions may have directions of movement in any of three orthogonal directions on the array retroreflector apparatus 14. Upon illumination of the target 14, the target converts the sensing beam 12 into a return beam 24 having two transverse overlapping return sensing signals, both of the return sensing signals having been frequency modulated to have frequency components which represent common motions on the target and to contain between the modulated signals, a difference signal which represents an array signal. In this preferred embodiment, the return beam 24 is returned on a return propagation path that has a direction of propagation opposite to the sensing beam 12 and approximately centered on the propagation path of the sensing beam 12.

Initially, the target separates the sensing beam into two sensing signals 26, 28. In this embodiment of FIG. 1, these sensing signals 26, 28 are separated by a polarizing beamsplitter 30 which is rigidly coupled to the casing 22. The two sensing signals have polarities which are orthogonal to each other. By the placement of optical components normal to the path of the sensing signals within the apparatus (such as the polarizing beamsplitter 30, a first retroreflector 32 and a second retroreflector 34), these optical components are used to deflect (reflect) and to Doppler shift the sensing signals.

These optical components are attached to the casing 22; thus, they are also coupled to motions upon the casing. When these coupled components move in directions along the path of either sensing signal as a result of motions on the casing, the components cause the sensing signal to be frequency modulated (FM), i.e., some movements of the coupled components impose a Doppler shift on the sensing signals at each location within the target where these moving components reflect and/or deflect the signals. In this particular embodiment, the polarizing beamsplitter 30 and the second retroreflector are rigidly attached to the casing 22, and the first retroreflector is attached (coupled) to the casing by being mounted to a transducer 36 which is rigidly attached to the casing. The transducer 36 is connected by the cable 18 to the amplifier 20 to couple an amplified array electrical signal to the transducer. Herein, the transducer 36 is an electro-mechanical device which transforms (converts) the array electrical signal to mechanical motion inline with path of one of the sensing signals. The transducer 36 may operate as a moving coil, a moving iron, an electrostatic, magnetostrictive, or piezoelectric transducer. In this embodiment, the amplified array signal when input into the transducer 36 causes the first retroreflector to move in a vertical direction. This vertical motion imposes a Doppler shift upon the sensing signal reflected from this retroreflector that is representative of the array signal.

The cumulative (net) Doppler shift imposed on the signals represent the net relative motions (velocities) of the Doppler shifting optical components with respect to the incident paths of the signals striking the coupled components. Since the velocities and/or movements of the optical components are a function of the motions of the earth (the array signal and the seismic signals) and the motions due to other external forces on the casing such as the wind or waves, the array retroreflector apparatus 14 of this invention imposes Doppler shifts on the sensing signals which are proportional to the surface particle velocity at the remote location for certain ground motions and also proportional to the velocity of the other Doppler induced motions. In particular, even when the combined electrical signals (the array signal) produced by the geophones are amplified, the amplified array signal will still represent the surface particle velocity. However, the increase in the amplitude of the array signal will result in the transducer causing the array retroreflector to move over a greater distance in the same period of time; thus, the retroreflector has an increased velocity relative to the path of the sensing signal, and, as a result, the Doppler shifts imposed on the sensing signal by this amplified seismic motion will be larger in comparison to local vertical seismic motions on the casing which also Doppler shift the signal. With larger Doppler shifts for the array signal, the remote sensing system will be able to detect weak seismic signals which may not be detectable by other prior art remote detection systems due to equipment limitations (frequency stability, background noise, etc.).

The sensing signals, after being modulated and reflected/deflected through the target, become return sensing signals. The return sensing signals are combined to form the return beam. Preferably, the return beam has the return sensing signals oriented such that the signals on the beam are transversely polarized with respect to each other. And, in addition, the return sensing signals are oriented on the return beam such that the two signals overlap so that the signals occupy substantially the same air space on the return propagation path of the return signal to the receiver.

The return beam is detected by the return beam detection system of the receiver. At the receiver, in preferred embodiments, the electronic and/or optical combination of the return sensing signals in a heterodyne process results in a frequency modulated difference signal. The frequency modulated difference signal represents the array signal. The frequency modulated signal may then be frequency demodulated to produce a time varying difference signal (amplitude modulated). The time varying difference signal is the seismic trace of the array signal.

The term "differential-mode" in this specification is used to indicate that two signals are returned from the remote location. However, as discussed previously, two return signals may be subject to different atmospheric effects. The bipolarized, differential-mode, LDI remote sensing system of this invention overcomes the problem of turbulent noise because the system of this invention uses a single sensing beam to illuminate the target and to receive in return a single return beam having two sensing signals on the return beam; thus, atmospheric effects on the beams result in common mode signals. This is because the single beam 12, which illuminates the target, is separated by the target 14 into the two sensing signals. Since these two sensing signals are obtained from a single beam, both signals have been affected equally by the atmosphere on the propagation path from the transmitter to the target; thus, the atmospheric effects on the two sensing signals are common mode signals. Similarly, after the signals are Doppler shifted, the two return sensing signals form a single return beam. The two transversely polarized return sensing signals on the return beam are aligned to overlap on the return beam so that they travel through substantially the same air space on a return propagation path to the receiver; thus, the atmospheric effects on the two return signals on the return beam are common mode signals and because the signals have different polarizations, they can be separated by the receiver into separate signals which may be processed to obtain a difference signal.

Figure 2A:
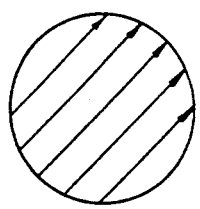
FIG. 2A is a simplified cross sectional diagram of a circularly polarized sensing beam.

In one highly preferred embodiment, a circularly polarized sensing beam is used for the sensing beam. It is well known to practitioners of the art that circularly polarized light is a special case of a transverse polarized beam. It may be considered as two beams (a first and a second polarized component) of equal intensities and of the same frequency such that the two components have perpendicular polarizations with a common propagation vector which rotates at the same frequency as the carrier frequency. FIG. 2A is a simplified cross sectional representation of a circularly polarized sensing beam. Within embodiments of the retroreflector apparatus, the circularly polarized beam is separated into two non-rotating polarized signals of the same frequency. Preferably, the polarities of the two signals are orthogonal to each other.

Figure 2B:
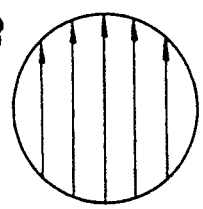
FIG. 2B is a simplified cross sectional diagram of a vertical polarized sensing signal.
Figure 2C:
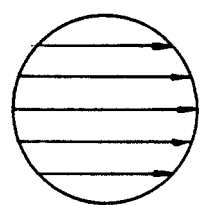
FIG. 2C is a simplified cross sectional diagram of a horizontal polarized sensing signal.
Figure 2D:
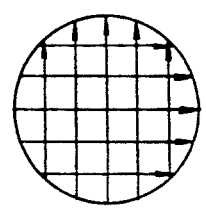
FIG. 2D is a simplified cross sectional diagram of a transverse polarized sensing beam having two signals on the beam.

It is also possible to obtain two polarized sensing signals within the retroreflector apparatus from other forms of sensing beams including the case of a sensing beam having a single non-rotating polarization. Preferably, the polarization angle for such a beam is approximately 45 degrees between the desired polarization planes of the separated signals. FIGS. 2B and 2C are simplified cross sectional representations of polarized components (signals) with FIG. 2B representing a polarized component (signal) having a vertically polarized sensing signal and FIG. 2C representing a polarized component (signal) having a horizontally polarized sensing signal. FIG. 2D is a simplified cross section which represents a vertical and horizontal polarized signal combined to show a transversely polarized beam having two polarized signals which overlap and occupy substantially the same air space. These transverse signals in the beam of FIG. 2D may or may not have the same carrier frequency.

In highly preferred embodiments of this invention, corner-cube retroreflectors are used because a corner-cube retroreflector has fairly robust alignment characteristics with respect to the remaining components of the array retroreflector apparatus and to the sensing beam. The sensing beam may experience some dispersion along the length of its propagation path to the target. In this case, even if the centerline of the sensing beams moves due to vibration, a portion of the sensing beam will still be incident upon the target. Consequently, corner-cube retroreflectors also enable the target to provide a stable return beam propagation path in spite of movements along the centerline of the path of the sensing beam and local movements on the target such as movements caused by the wind, or in the case where the target is floating, the movements of the water. These advantages can be seen by again referring to FIG. 1. FIG. 1 includes a simplified optical diagram of the array retroreflector apparatus 14 which shows paths which represent the sensing beam 12, return beam 24, first sensing signal 28, and second sensing signal 26 as they illuminate, pass through, and leave the target 14 as an aid in the explanation of the operation of this invention. However, these paths are not to scale within the apparatus 14. The preferred circularly polarized sensing beam (or any sensing beam), preferably, has a cross sectional area normally incident upon a side window 40 (or top window 42) of the apparatus 14 that illuminates substantially all of the window.

The controlling factor for illumination of the array apparatus 14 is that the intensity of the illumination provided to the target 14 is such that the return beam 24 will have enough power in each return sensing signal to ensure an adequate carrier to noise ratio (CNR) for homodyning or heterodyning and demodulating each signal. The cross sectional area of the sensing beam or return beam may increase over the distances involved in this invention due to beam spreading (diffusion). However, it is possible to control the intensity of the sensing or return beam by using additional optical elements to control the rate of beam spreading from the transmitter to the target and/or compress the return beam at the receiver.

Here in FIG. 1, the polarizing beamsplitter 30 is illuminated by a circularly polarized sensing beam 12 having an approximately horizontal propagation path. The beam illuminates the beamsplitter 30 through the side window 40. The polarizing beamsplitter splits the beam into two approximately perpendicular sensing signals. One signal, a first sensing signal is deflected downward along a vertical ordinate to encounter the first (corner-cube) retroreflector 32. The second sensing signal maintains the propagation path of the sensing beam and encounters the second (corner-cube) retroreflector.

In this specification, an orthogonal coordinate system is used. The terms "vertical" and "horizontal" are used with respect to the motions on the array retroreflector apparatus. Vertical defines one ordinate for motions up and down along the vertical ordinate. The horizontal is further defined with respect to the path of the transmitted sensing beam to identify a horizontal-inline ordinate and a horizontal-crossline ordinate. The term "inline" is used herein to identify motion or direction along the path of a sensing beam 12 or sensing signal. A horizontal line, formed by intersecting a vertical plane which extends in the inline direction of a sensing beam with a horizontal plane, defines the horizontal-inline ordinate and the horizontal-inline direction. A horizontal line perpendicular to the horizontal-inline ordinate defines the horizontal-crossline ordinate and horizontal-crossline direction.

Returning to the corner-cube retroreflectors, a corner-cube (trihedral) retroreflector has the property that any ray entering the effective aperture will be reflected and emerge from the entrance/exit face parallel to itself, but with an opposite direction of propagation. An incident beam, hitting the effective aperture, is reflected exactly back on itself. These properties are, within acceptable angle limits, independent of the orientation of the corner-cube retroreflector. Because the incident beam is reflected within the retroreflector such that the reflected output beam is reflected exactly back on itself, the individual rays of the reflected beam are parallel to their initial position in the incident beam which strikes the retroreflector. This characteristic of the retroreflector is due to the structure of a corner-cube retroreflector; it has three mutually perpendicular reflectors and each ray entering the retroreflector will reflect from each reflector before exiting.

Each of the reflectors move in the same direction, but because they face each other, each reflector has a different relative motion with respect to an incident beam striking it from the previous reflector. Since each ray reflects from each mutually perpendicular reflector, the net relative movement for lateral motions on the corner-cube with respect to that ray is zero; thus, the Doppler shifts, placed on each ray for the lateral motions on each reflector as it reflects through the corner-cube, cancel. In FIG. 1, the lateral motions on the first corner-cube retroreflector 32 are motions in the horizontal-crossline and the horizontal-inline directions. And, the lateral motions on the second corner-cube retroreflector 34 are motions in the vertical and horizontal-crossline directions. However, for motions inline with the path of a sensing signal, the retroreflectors will provide a Doppler shift. Consequently, in the foregoing embodiment of FIG. 1, the first corner-cube retroreflector 32 will only provide Doppler shifts for motions in the vertical direction and the second corner-cube retroreflector 34 will only provide Doppler shifts for motions in the horizontal-inline direction.

The corner-cube retroreflectors, if properly aligned with the incidence signals, return the signals exactly back on themselves; thus, the first and second polarized signals upon reflection from the retroreflectors are combined into an overlapping transversely polarized return beam within the beamsplitter such as shown in FIG. 2D. Accordingly, the overlapping signals on the transversely polarized return beam will experience approximately the same fluctuations in their carrier frequency due to atmospheric effects and these fluctuation will be common mode signals.

Figure 2E:
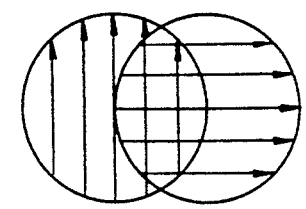
FIG. 2E is a simplified cross sectional diagram of a horizontal polarized sensing signal and a vertical polarized sensing signal which are not aligned to share the same air space.

Conversely, if one of the corner-cube retroreflectors is misaligned with respect to a path of a sensing signal such that the sensing signal does not enter the effective aperture of the corner-cube retroreflectors, the reflected signals will not overlap (as depicted in FIG. 2E) in the beamsplitter and a difference turbulence region is encountered by the two signals. In this case, the turbulence noises on the two return sensing signals differ, i.e., the turbulence does not impose the same common mode signal on both signals, and complete cancellation is not achieved.

Other types of retroreflectors may be used in the array retroreflector apparatus, but the self-aligning characteristics of a cornercube retroreflector to continue to return a signal exactly on itself as the retroreflector moves due to motions imposed on it will ensure (within limits imposed by the effective aperture of the corner-cube retroreflector) that an approximately constant return propagation path is maintained for the return beam.

In addition, because corner-cube retroreflectors only provide Doppler shifts for motions which move in a direction along the incident path (inline) of the signal, a corner-cube retroreflector coupled to the casing (as disclosed herein) may be used to Doppler shift a signal for selected motions, i.e., motions along one ordinate. The Doppler shifts due to the selected motions may then be used to cancel Doppler shifts added to one of the signals by an apparatus component which may be difficult to isolate (decouple) from the casing. For example, returning to FIG. 1, the polarizing beamsplitter 30 deflects the first sensing signal twice, each time the Doppler shifted frequency components represent vertical and horizontal-inline motions.

The beamsplitter 30 does not contribute a Doppler shift for horizontal-crossline motions because the deflection points on the beamsplitter are parallel to the crossline direction; hence, the beamsplitter has no relative movement with respect the sensing signal in the horizontal-crossline direction.

It is not practical to completely isolate the beamsplitter so that it does not Doppler shift the first sensing signal. However, these Doppler shifted components must be removed from the signal before the difference signal may be obtained. These Doppler shifts may be removed by canceling them with other common mode Doppler shifted signals, either within the array apparatus 14 or by heterodyning with another signal. In this particular embodiment, the vertical Doppler shifts contributed by vertical motions on the beamsplitter may be canceled by coupling the vertical motions on the casing to the first retroreflector through the transducer.

Cancellation is achieved by taking advantage of the relative motions of the beamsplitter 30 and the first retroreflector 32 with respect to the path of the first sensing signal 28. The relative motions of the first (corner-cube) retroreflector and the beamsplitter are in opposite directions with respect to incident signals of the first sensing signal. This can be seen by assuming the beamsplitter 30 is moving in an upward direction. Although a polarizing beamsplitter simultaneously separates and deflects the polarizing sensing signal, we could, for the purpose of this explanation, assume that the beamsplitter acts as a "mirror" at a 45 degree angle (the reflection or deflection points being planar to this angle), and that the "mirror" only reflect rays having the polarity of the first sensing signal 28. As the "mirror" (beamsplitter) rises, the incident path lengthens for the first sensing signal to reflect from the "mirror". But, the first retroreflector 32 is also rising and the upward motion shortens the incident path of the first sensing signal reflected from the beamsplitter 30. In addition, this upward motion of the "mirror" (beamsplitter) also lengthens the path of the first sensing signal returning from the retroreflector 32. Since the cumulative vertical Doppler shifts of the beamsplitter 30 are approximately equal to the vertical Doppler shifts imposed on the first sensing signal by the vertical motions coupled to the retroreflector, the vertical Doppler shifts may be canceled within the array.

However, it is not possible to use the first (corner-cube) retroreflector to provide Doppler shifts to cancel horizontal-inline motions. But, the second (corner-cube) retroreflector may be coupled to the casing so that the second sensing signal 26 may be Doppler shifted to contain frequency components which represent the horizontal-inline motions on the casing. These horizontal-inline Doppler shifted frequency components are common mode with the cumulative horizontal-inline Doppler shifted frequency components placed on the first polarized signal by the beamsplitter 30.

The ability of the array retroreflector apparatus to cancel motions on the casing enables this apparatus to float or to be pole mounted above foliage or other local obstructions and to move within certain limits due to the wind. These wind (or wave) induced motions will be common mode and cancel. The target may even be subjected to small moments about its vertical axis. This is because, as mentioned, the retroreflector returns signals exactly on themselves if they enter within the effective aperture of the corner-cube retroreflector. In addition, even if the beamsplitter and the second retroreflector are no longer exactly aligned along the horizontal-inline axis with the sensing beam due to small moment forces, the Doppler shifts resulting from motions which are inline with the second sensing signal, i.e., motions which move in a direction along a path between the beamsplitter 30 and the second retroreflector 34, will still be common mode to the beamsplitter and the second retroreflector.

The embodiment of FIG. 1 as other embodiments presented in this specification may also be used with a remote sensing system which is elevated above the detector station, such as, an airborne system. Lenses, wedges or other optical equivalents may be mounted on either the side 40 or a top 42 window to increase or change the field of view to the retroreflector apparatus of this invention. Preferably, if beam deflection is used to increase the field of view, the deflected sensing beam should enter the top 42 or side window 40 such that the incident path of propagation for the beam at the beamsplitter after deflection is aligned with the internal optical components of the target.

For top window 42 illumination of the embodiment of FIG. 1, the sensing beam enters the window approximately vertical to the beamsplitter 30.

The following explanation of top window illumination will be in terms of the sensing beam having some deviation from the vertical so that the terms "horizontal-inline" and "horizontal-crossline" will still apply in the explanation of this embodiment.

With the orientation of beamsplitter 30 as previously described, the polarizing beamsplitter 30 will separate a circularly polarized sensing beam which illuminates the top window into a first polarized sensing signal and a second polarized sensing signal. The polarity of the first polarized sensing signal is orthogonal with respect to the polarity of the second polarized sensing signal.

In this case of top window 42 illumination, the first sensing signal is deflected by the beamsplitter into second retroreflector 34. Here, the relative motions of the second retroreflector 34 and the beamsplitter 30 are in opposite directions with respect to the first sensing signal. Consequently, motions in the horizontal-inline direction cancel on the first sensing signal and the first return sensing signal only contains frequency components which represent vertical motions (the cumulative vertical motions of the beamsplitter 30). The second sensing signal passes through the beamsplitter and is Doppler shifted for vertical motions on the casing coupled to the retroreflector by way of the transducer and for the transducer induced vertical motions which represent the array signal. Thus, the second return sensing signal contains Doppler shifted frequency components which represent the array signal and vertical motions on the target. The vertical common mode frequency components are canceled in heterodyning leaving a difference signal which represents the frequency modulated array signal.

When the beamsplitter 30 is illuminated by the top window 42, it does not impart a Doppler shift on the deflected signals for horizontal-crossline motions because the deflection points within beamsplitter 50 are, again, parallel to the horizontal-crossline direction; thus, the polarizing beamsplitter 30 has no net motion with respect to the path of the sensing signals in the horizontal-crossline direction, i.e., the beamsplitter deflection points are moving perpendicular to the path of the signals.

Figure 3:
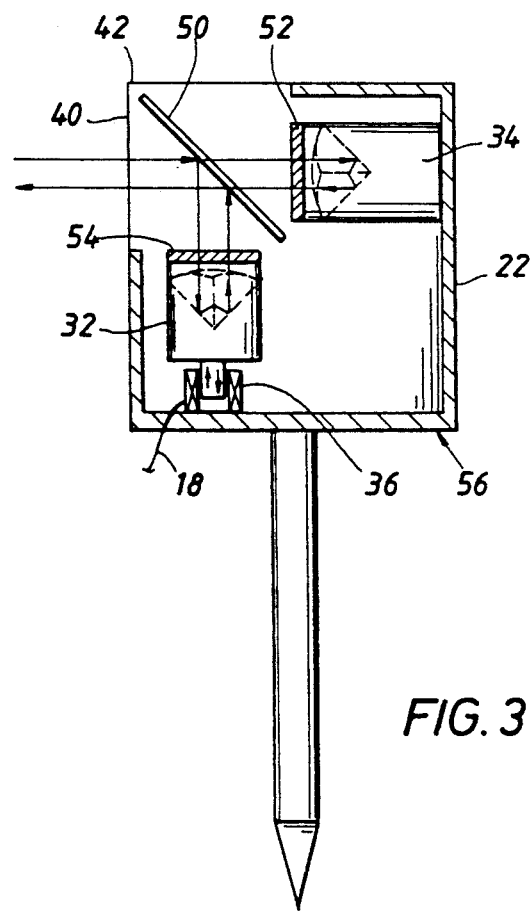
FIG. 3 is a simplified cross sectional side view of an embodiment of the array retroreflector apparatus of this invention, the apparatus having a nonpolarizing beamsplitter. This figure also includes a simplified side view of an optical block diagram.

FIG. 3 is a simplified side view of another array retroreflector apparatus embodiment of the present invention which uses a nonpolarizing beamsplitter 50 rigidly coupled to casing 22. The array retroreflector apparatus 54 is similar to the embodiment presented in FIG. 1. The apparatus 54 has windows at the top 42 and the side 40. And, in this preferred embodiment, the target 54 has one corner-cube retroreflector 34 (the second retroreflector) rigidly attached to the casing 22; it is also aligned with the horizontal-inline direction. The first (corner-cube) retroreflector 32, again, is aligned with the vertical ordinate and coupled to vertical motions through transducer 36. Transducer 36 is connected by cable 18 to the amplifier (not shown).

The embodiment of FIG. 3 uses the nonpolarizing beamsplitter 50 with a vertically polarized screen 52 and a horizontally polarized screen 54 to perform the same functions as the polarizing beamsplitter 30 of FIG. 1. Preferably, the nonpolarizing beamsplitter is oriented at approximately 45 degrees from vertical and parallel to the crossline direction. The operation of array retroreflector apparatus 56 is described herein in terms of a circularly polarized sensing beam which illuminates the side window 40.

The nonpolarizing beamsplitter 50, preferably, deflects approximately half the sensing beam downward along the vertical ordinate to form the first sensing signal and allows approximately half the circularly polarized beam to pass straight through (here, along the horizontal-inline ordinate) as the second sensing signal.

The first sensing signal, in being deflected (reflected) by nonpolarizing beamsplitter 50, is Doppler shifted by the beamsplitter 50 to contain frequency components which represent vertical and horizontal-inline motions coupled to the beamsplitter 50. The first sensing signal (still circularly polarized) then encounters the horizontally polarized screen (polarizer) 54 located over the first retroreflector 32. In this explanation, the sensing beam can be considered to contain electromagnetic radiation having two polarizations (a vertical polarization and a horizontal polarization). The vertically polarized electromagnetic radiation from the circularly polarized beam is absorbed by the screen 54. Horizontal polarized electromagnetic radiation passes through the horizontally polarized screen 54 as a first polarized signal (the polarity of this signal is orthogonal with respect to the polarity of a second polarized signal to be discussed herein later).

The first polarized signal is Doppler shifted and reflected from the first retroreflector back into beamsplitter 50. In Doppler shifting the first polarized signal at retroreflector 32, the first grouping of frequency components is frequency modulated to form a second grouping of frequency components. This second grouping also contains the contribution of the vertical motions of the first retroreflector due to vertical motions coupled through the casing 22 and the transducer 36 vertical motions which represent the array signal.

At beamsplitter 50, a portion (approximately one half in this embodiment) of the reflected first polarized signal is deflected and Doppler shifted by the beamsplitter 50 to form the first return sensing signal. The undeflected portion (approximately one half in this embodiment) of the reflected signal passes through the beamsplitter and is not used.

In deflecting the portion of the reflected first polarized signal, the beamsplitter 50 frequency modulates the deflected portion by Doppler shifting the second grouping of frequency components into a third grouping of frequency components which represent the cumulative Doppler shifts of the first sensing signal through the target 56. Since, the relative motions of the beamsplitter 50 and the first retroreflector 32 are in opposite directions with respect to the first sensing signal, the vertical motion Doppler shifts cancel on the first sensing signal. Consequently, the third grouping of frequency components on the first return sensing signal contains Doppler shifted frequency components which represent the array signal and horizontal-inline motions.

The second sensing signal, when passing though nonpolarizing beamsplitter 50, is not Doppler shifted by the beamsplitter 50. The circularly polarized beam of the second sensing signal then encounters the vertically polarized screen (polarizer) 52 which allows electromagnetic radiation that is vertical polarized to pass through as a vertical polarized beam (the second polarized signal) to reflect from the second retroreflector 34. The vertically polarized screen 52 absorbs the horizontal polarized radiation of the circularly polarized beam. The second polarized signal is Doppler shifted by retroreflector 34 for horizontal-inline motions and reflected back to beamsplitter 50. Consequently, the reflected second polarized signal contains frequency components which represent horizontal-inline motions. At beamsplitter 50 a portion (about half) of the reflected second polarized signal passes through the beamsplitter 50, as the second return sensing signal. Here, the nonpolarizing beamsplitters also deflects a portion (about half of the signal) of the reflected second polarization signal. This signal is deflected upward and it is not used. The second return sensing signal is combined with the first return sensing signal in the beamsplitter 50 to form a return beam.

Again, if the retroreflectors 32, 34 are aligned properly, with respect to each other, the illuminated window, and the nonpolarizing beamsplitter 50, the return beam contains transverse polarized return sensing signals which substantially overlap.

The target 56 of FIG. 3 also provides Doppler shifts as described for top window 42 illumination in the embodiment of FIG. 1. The major difference, between the two embodiments of FIGS. 1 and 3 for top window 42 and side window 40 illumination, is the loss of approximately three-fourths of the power of the sensing beams in converting the sensing beam to the return beam. This loss is due to the absorption of the transverse electromagnetic radiation of the sensing signals which do not pass through the polarized screens 52, 54 and the portions of the reflected signals which are not combined in the nonpolarizing beamsplitter 50 to form the return beam.

The polarization orientations of the polarizing screens (polarizers) may be reversed or rotated for other embodiments of this invention. However, it is highly preferred that the polarities of the polarizers are orientated to ensure that the polarities for the return sensing signals which make up the return beam remain orthogonal with respect to each other.

In a highly preferred embodiment which uses an infrared sensing beam (preferably circularly polarized), the nonpolarizing beamsplitter and the polarizers are wire grid polarizers.

Figure 4:
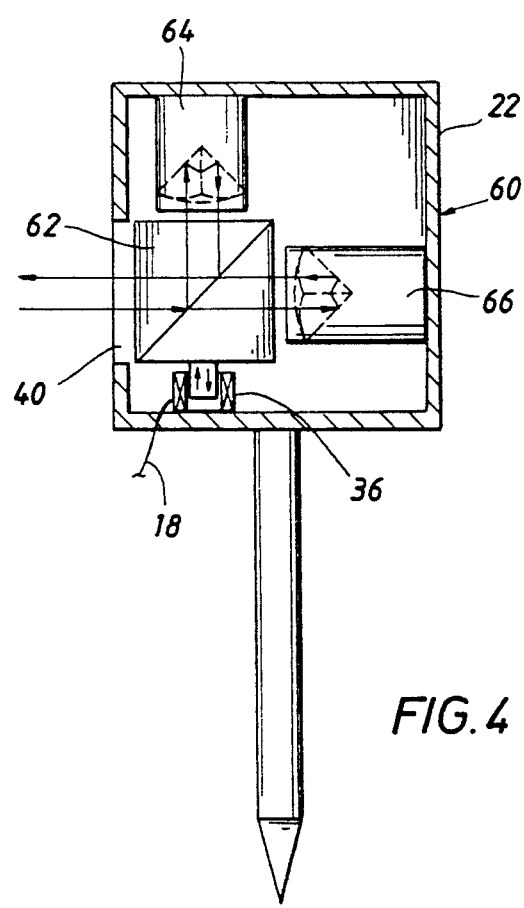
FIG. 4 is a simplified cross sectional side view of an embodiment of the array retroreflector apparatus of this invention, the apparatus having a polarizing beamsplitter driven by a transducer. This figure also includes a simplified side view of an optical block diagram.

Referring now to FIG. 4, a cross sectional side view of another embodiment of the array retroreflector apparatus is shown. The target 60 of this embodiment has a side window 40, and a polarizing beamsplitter 62 which is coupled to motions on the casing 22 through transducer 36. The transducer 36 drives the polarizing beamsplitter in the vertical direction to Doppler shift a first sensing signal to have frequency component which represent the array signal. In this preferred embodiment, the first sensing signal is separated from the sensing beam and deflected upward to encounter a first (corner-cube) retroreflector 64 which is coupled to motions on the casing. Consequently, the relative motions of the beamsplitter 62 and the first retroreflector 64 have opposite directions with respect to the first sensing signal; thus, the vertical Doppler shifts produced by vertical motions on the beamsplitter 62 and the first retroreflector will cancel. The first return signal will have frequency components that represent the array signal (due to the transducer moving the beamsplitter vertically) and the horizontal-inline motions on the beamsplitter. The second sensing signal will again be Doppler shifted by the second (corner-cube) retroreflector 66 to have frequency components that represent horizontal-inline motions.

Figure 5:
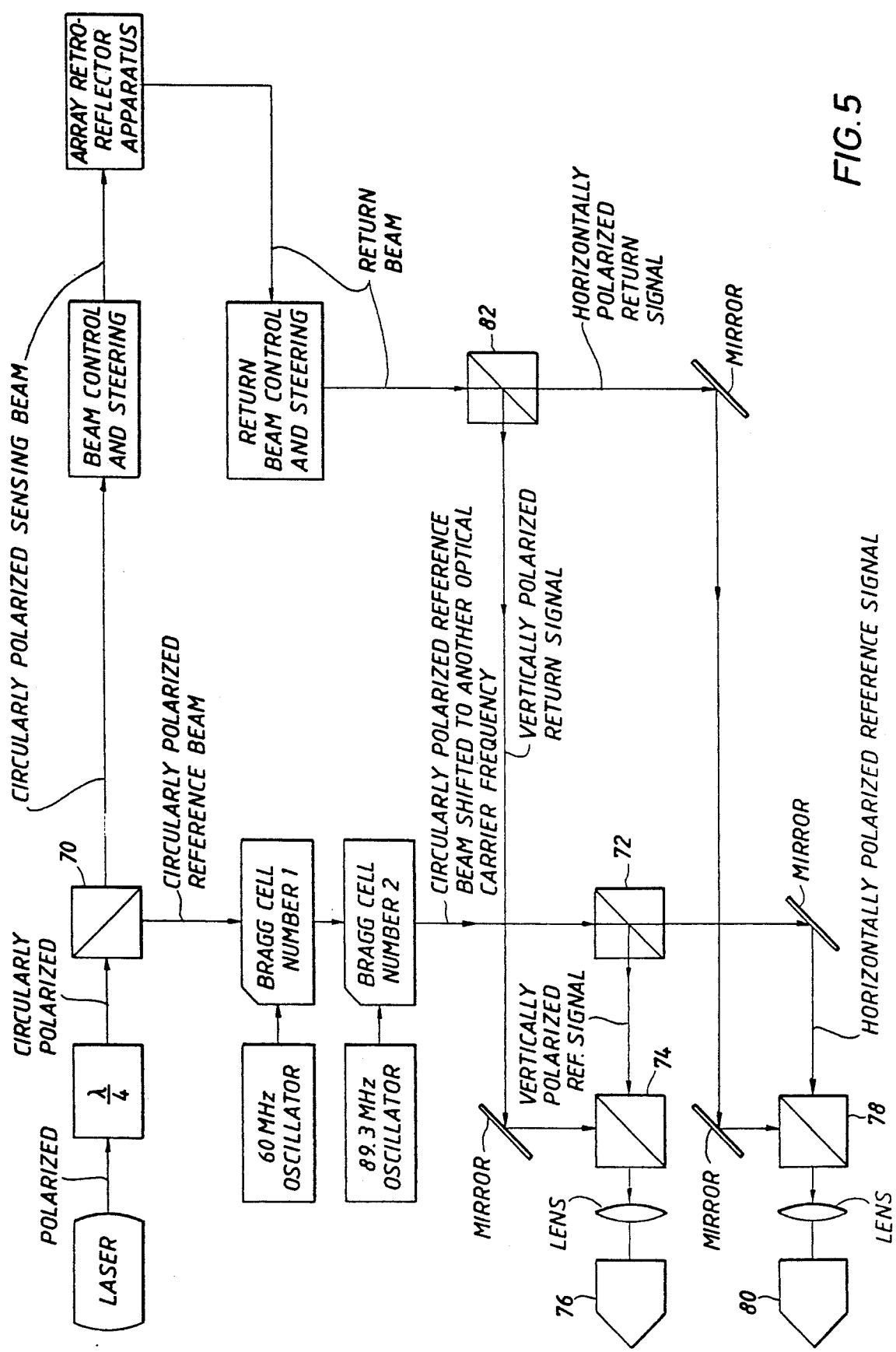
FIG. 5 is a simplified top view of an optical block diagram of the transmitting and receiving portion of one embodiment of a heterodyne, bipolarized, laser differential mode interferometry (LDI), remote sensing system which transmits a circularly polarized sensing beam to the array retroreflector apparatus, the sensing system having two photodetector channels and reference beams for heterodyning with the sensing beams.

The embodiment shown in FIG. 5 of the array retroreflector apparatus may be adapted to operate with a nonpolarizing beamsplitter and polarizing screens as described earlier in this specification and these adaptations are herein included within the scope of the specification.

DIFFERENTIAL MODE LDI

The remote sensing system of this invention features a bipolarized, differential mode, LDI (laser differential interferometry) system. The term "bipolarized, differential mode LDI system" for the purposes of this specification represents a remote sensing system which receives from the target (remote detector) two transversely polarized return sensing signals, both of which have been Doppler shifted to contain frequency components which represent common motions coupled to the target at a selected location and the signals contain between them a difference signal which represents an electrical signal produced at the remote location; the return signals are then combined by various techniques, including a homodyne or heterodyne process, to obtain a frequency modulated difference signal which represents the electrical signal at the remote location. As mentioned previously, in preferred embodiments, heterodyning is used to obtain a difference signal which provides indications of "up" and "down" Doppler motions and the difference signal represents an array signal obtained from a geolight system.

The use of the designations of "horizontal", "vertical", "first" and "second" in reference to the signals in these explanations are for clarity. Other orientations for the signals to achieve the same results may be used. However, as mentioned previously, it is highly preferred that the polarities of the return sensing signals on the return beam be orthogonal with respect to each other.

In addition, the specific components identified on the simplified optical block diagrams in the figures of this specification may be changed to other optical components which provide the same function or combination of functions as shown in the figures to modulate optical signals in order to obtain electrical signals from the return sensing signals. Other optical components which may be used (but not limited to) in the transmission and receiver system or in the target of this invention are: Glan-Taylor polarizing prisms, Glan-Thompson polarizing prisms, Wollaston prisms, Beamsplitting Thompson prisms, beam displacing prisms, etc.

Heterodyne Differential Mode LDI System with Reference beams

Figure 6:
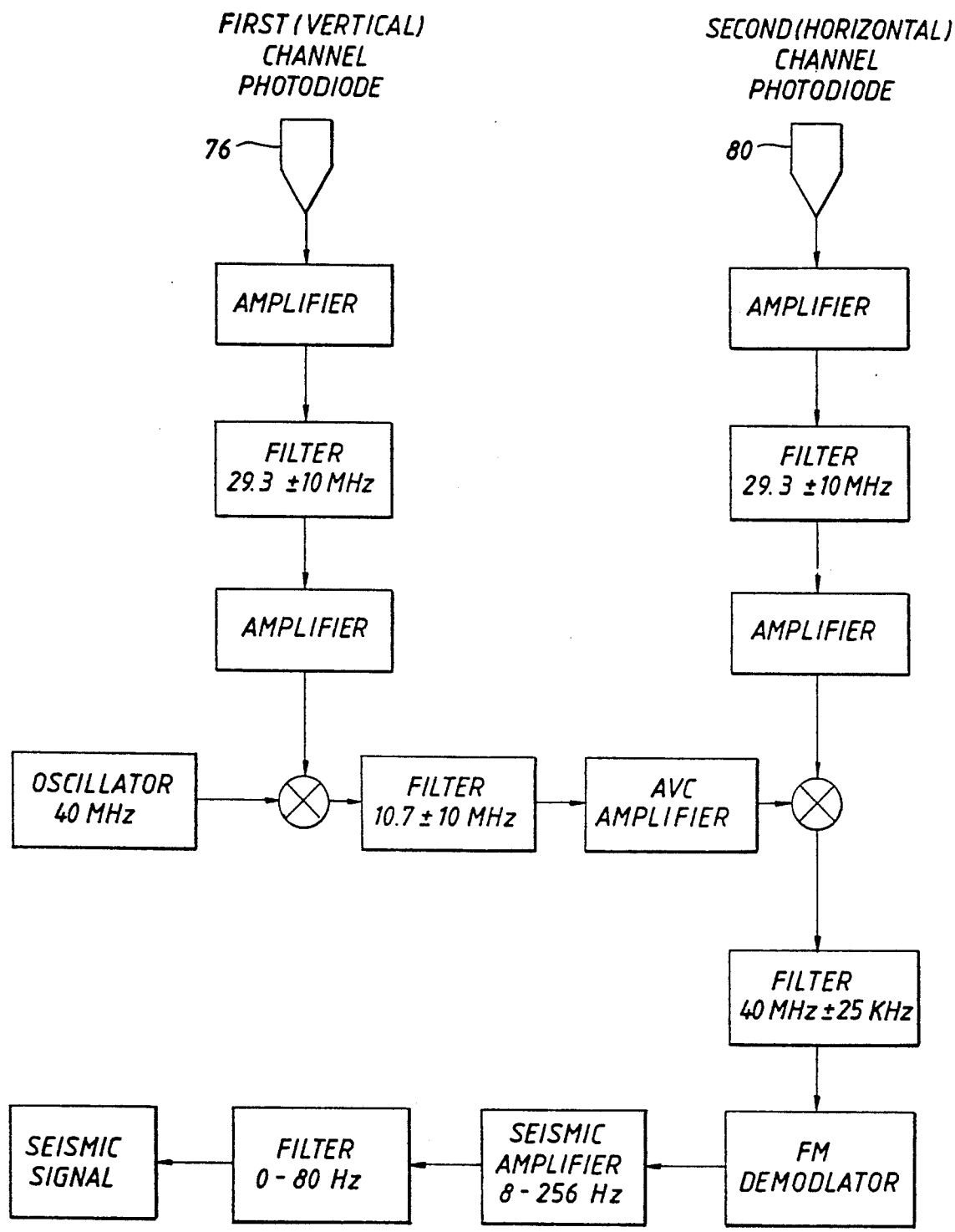
FIG. 6 is a block diagram of the electronic stages of the embodiment of the laser differential mode LDI of FIG. 5.

One preferred heterodyne embodiment of the remote sensing system of this invention, which transmits a circularly polarized sensing beam, is shown in FIG. 5. FIG. 5 is a simplified "top view" optical block diagram of a Differential mode LDI system which uses reference signals in an optical heterodyning process to reduce the carrier frequency of the return sensing signals so that any frequency modulated components on the return sensing signals may be processed electronically. FIG. 6 is a simplified block diagram of the electronic stages which may be used with the optical stages of the preferred embodiment of FIG. 5 to heterodyne and demodulate the electrical signals.

Referring to FIG. 5, a linearly polarized beam is produced by a laser. The beam is oriented with and passed through a quarter-wave plate such that it becomes circularly polarized.

The beam then encounters a nonpolarizing beamsplitter 70 that divides the circularly polarized beam into a forward circularly polarized beam and a deflected circularly polarized beam. The forward beam is now referred to herein as a sensing beam. The sensing beam then enters a beam control and steering system which directs the sensing beam to an array retroreflector apparatus (target) of this invention. In some embodiments, a beam control and steering system may direct a plurality of transmitted beams to a plurality of geolights at different detector stations. Returning to the nonpolarizing beamsplitter 70, the circularly polarized deflected beam will now be referred to herein as a reference beam. In this embodiment, the reference beam is frequency shifted by two cascaded Bragg cells. A Bragg cell is an acousto-optical modulator that shifts the impinging reference beam by the frequency of the applied oscillator signal. In this embodiment, the first Bragg cell shifts the reference beam by −60 MHz and the second Bragg cell shifts the reference beam by +89.3 MHz for a total frequency shift of +29.3 MHz.

It should be understood that the values of the frequencies provided in this discussion, as well as other frequencies discussed herein, are for an explanation of the particular embodiments described. Other frequencies may be used with these particular embodiments or similar embodiments of this invention.

After the second Bragg cell, the circularly polarized reference beam is split into two polarized signals, a first and a second reference signal, by a polarizing beamsplitter 72 (a first polarizing beamsplitter). The first reference signal will, in this explanation, be a vertically polarized reference signal and the second reference signal will be a horizontally polarized reference signal to correspond with the "top view" optical block diagram of FIG. 5. The polarizing beamsplitters 72 and 82 (a second polarizing beamsplitter) of FIG. 5 are oriented such that vertically polarized signals, which are separated from the reference or return beam (to be discussed herein later, are deflected.

The first sensing signal (the vertically polarized signal) is deflected within polarizing beamsplitter 72 and directed into nonpolarizing beamsplitter 74 which also has the function of a beam combiner. Within this nonpolarizing beamsplitter 74, a portion of the first reference signal is again deflected. At the output of beamsplitter 74, the deflected portion of the first sensing signal beam is focused by a lens onto a first channel photodiode 76 (a vertical channel photodiode).

Returning to polarizing beamsplitter 72, the second reference signal (the horizontally polarized signal) passes through this polarizing beamsplitter 72. The second reference signal is then reflected off a mirror into nonpolarizing beamsplitter 78 which also acts as a beam combiner. A portion of the second reference signal passes through beamsplitter 78 without being deflected. At the output of the beamsplitter 78, the undeflected portion of the second reference signal is focused by a lens onto a second channel photodiode 80 (a horizontal channel photodiode).

The sensing beam, as discussed previously, is converted by the target into a return beam having two transversely polarized return sensing signals, both of the return sensing signals having been frequency modulated, with the signals containing between them a difference signal which represents the array signal of the detector station. The return beam is detected by the return beam control and steering system and passed to polarizing beamsplitter 82.

The return beam control and steering system and the sensing beam control and steering system in some embodiments could be integrated into a single system. As one system, a single (sensing and return) beam control and steering system could provide for directing and detecting a plurality of sensing beams and return beams. Beam control and steering as a single system or as separate systems may also be used to expand the sensing beams (beam spreading) for transmission and to compress the return beams upon detection. In addition, since in preferred embodiments the corner-cube retroreflectors of the array retroreflector apparatus of this invention returns the return beam approximately centered on the path of the sensing beam, a common component could be used in the sensing beam transmission path and the return beam reception path to automatically align the receiver with the transmitter. This component, in preferred embodiments, is a nonpolarizing beam splitter. When the sensing beam is transmitted, approximately half of the transmitted beam is deflected by the beamsplitter and does not reach the target. Similarly, about half of the return beam passes through the beamsplitter and is not used by the receiver. But, about half of the return beam is deflected into a polarizing beamsplitter such as shown on FIG. 5, as polarizing beamsplitter 82.

At polarizing beamsplitter 82, the return sensing signals are separated from the return beam to form two polarized signals, a first return signal and a second return signal. In this embodiment, the first return signal is vertically polarized and the second return signal is horizontally polarized. The first return signal is deflected by beamsplitter 82 into a mirror. The first return signal is then reflected off the mirror into nonpolarizing beamsplitter 74 where a portion of the first return signal is deflected into a lens. The lens focuses the deflected portion of the first return signal such that it is superimposed over the first reference signal on the first channel photodiode 76. Both of the superimposed signals on the photodiode 76 are vertically polarized.

The second return signal passes through beamsplitter 82 and it is reflected off a mirror into nonpolarizing beamsplitter 78. A portion of the second return signal is deflected by beamsplitter 78 into a lens. The lens focuses the deflected portion of the second return signal such that it is superimposed over the second reference signal on the second channel photodiode 80. Both of the superimposed signals on the second channel photodiode 80 are horizontally polarized.

At photodiodes (photodetectors) 76 and 80, a process known as optical heterodyning takes place to produce an electrical channel signal from each photodetector. The outputs of photodiodes 76 and 80 are radio frequency (RF) signals (product signals) whose strength is proportional to the intensity of the incident light (the reference and return signals). The desired product signal from each of the photodiodes 76, 80, of this embodiment of the invention has a carrier frequency which is the photodiode difference frequency between the reference signals and the return sensing signals. In this embodiment, the photodiode difference frequency is 29.3 MHz for the RF signal from each photodiode 76, 80. This is the frequency shift placed on the reference beam by the cascaded Bragg cells. The RF signal from each photodiode has the Doppler shifted frequency components of the return sensing signal centered on the carrier frequency of 29.3 MHz. The first photodiode 76 provides an RF signal which has the Doppler shifted frequency components produced by the frequency modulation of one of the sensing signals at the target; and, the second photodiode 80 provides an RF signal which has the Doppler shifted frequency components produced by the frequency modulation of the other sensing signal at the target.

The cascaded Bragg cells are used in this embodiment to decrease the effects of an unwanted, contaminating signal. A small part (less than 0.1%) of the incident beam (the circularly polarized reference signal), still at the original laser frequency, leaks through the first Bragg cell. Without the second Bragg cell, the presence of this leakage beam may interfere with a return sensing signal at the photodetector because the polarized reference signal is usually considerably stronger than the return sensing signal.

In other embodiments, a second Bragg cell may not be necessary, especially if the return sensing signal is considerably stronger at the photodetector than the leakage reference signal from a single Bragg cell.

Referring now to FIG. 6, it shows in block diagram form the electronic stages of an embodiment which may be used to combine the first (vertical) channel signal with the second (horizontal) channel signal of this differential mode LDI embodiment to obtain a signal which represents the array signal of the detector station. The RF signals from the output of the vertical channel photodiode and the horizontal photodiode are amplified, then enter filters. The filters are centered at 29.3 MHz and are broad enough to accommodate any frequency modulation due to laser frequency jitter, air turbulence, laser platform motion and motions on the target. In this embodiment, the filters have a bandpass of 10 MHz on each side of the center frequency. These filters eliminate the Bragg cell leakage signals at 89.3 MHz and 60 MHz. At the output of the filters the signals are again amplified.

The first (vertical) channel signal is then multiplied by a 40 MHz oscillator signal in another heterodyning stage. This multiplication causes signals at the sum (69.3 MHz) and difference (10.7 MHz) frequencies. The difference frequency (10.7 MHz) is allowed to pass through a filter which is centered at 10.7 MHz and has a bandpass in this embodiment of 10 MHz on each side of the center frequency. Note that the taking of the difference frequency resulted in a polarity reversal for the carrier frequency and the frequency components centered about the first (vertical) channel's carrier frequency. The resulting 10.7 MHz carrier signal out of the filter is amplified and then multiplied with the second (horizontal) channel output signal in an additional heterodyning stage to produce a sum signal. The second (horizontal) channel is still centered at 29.3; thus, the sum frequency of the first and second channel signals is 40 MHz for the sum signal.

In addition, because the polarity of the first (vertical) channel signal is reversed before being combined with the second (horizontal) channel signal, the sum signal will not include frequency components of the two signals which are substantially identical but of reverse polarity (the common mode signals in this stage), that is, the common mode signals are canceled electronically. Only the FM modulation from the target which represents the difference signal between the first and the second return sensing signals will remain centered at the 40 Mhz carrier. Any common modulation components (common mode signals) due to air turbulence, laser jitter, and in-line radar transmitter and target motion are eliminated. Ideally, only the Doppler modulation resulting from the array signal remains on the 40 MHz carrier.

The sum signal is passed through a 40 MHz quartz filter with a bandpass of 250 kHz on each side of the center frequency. When the array electrical signal is amplified by the amplifier, the amplified array signal may cause the transducer 36 to move the retroreflector (or beamsplitter) at a rate of 10 cm/sec or higher for the largest seismic motions detected by the geophones, so a maximum Doppler shift at the higher conventional laser frequencies would be around 300 kHz for the array signal (Fdop=2 Vseis/Wavelength where Fdop is the Doppler shift, Vseis is the relative velocity at the Doppler shifting optical component and Wavelength is the wavelength of the carrier frequency of the transmitted laser beam). The largest vertical motions (motions of the earth) induced in exploration surveys are on the order of 1 cm/sec so the maximum Doppler shift at the higher conventional laser frequencies is around 30 kHz. Consequently, the amplification of the array signal increased the Doppler shift by a factor of 10. Greater increases are possible. In other embodiments, a filter with a broader bandwidth may be used The FM demodulator converts the desired Doppler shifted signal (the difference signal) about the center frequency of the sum signal to a time varying signal (amplitude modulated signal) which represents the velocity of the ground motions at the remote location. The demodulated signal is then amplified with a constant gain over the frequency range of 8–256 Hz. It may then pass through a low pass filter with a frequency range of 0–80 Hz to produce the seismic signal which represents the velocities of the desired ground motions at the remote location, which in this case are the vertical ground motions.

Again, the bandwidths, the center frequencies of the filters used and the heterodyning frequencies used in this explanation may be changed in this or the other embodiment shown to other frequencies to achieve similar results. In addition, some amplification stages may be eliminated or moved to other stages in the FM demodulation process.

Heterodyne Differential Mode LDI with One Photodetector Channel

Figures 7, 8:
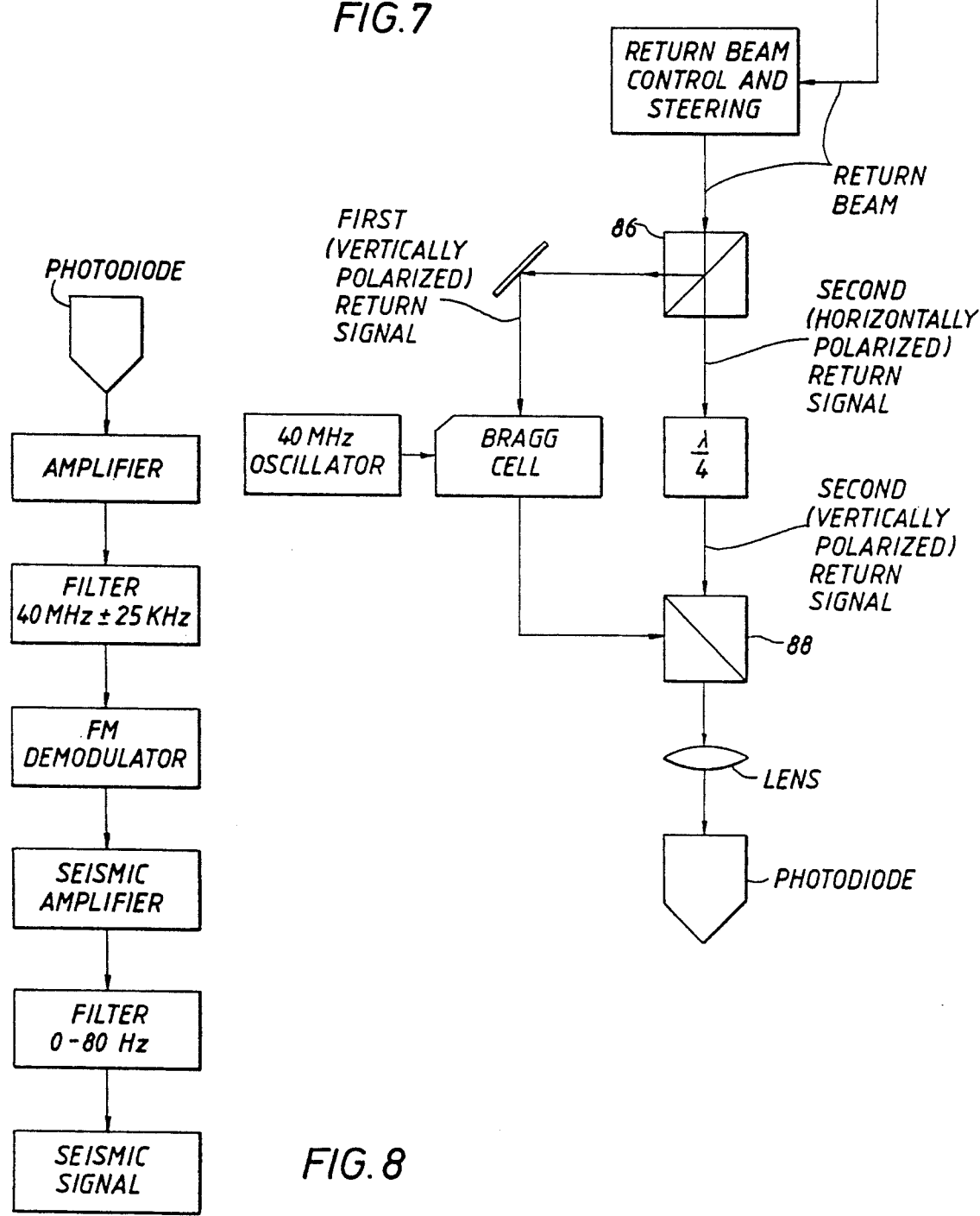
FIG. 7 is a simplified top view of an optical block diagram of the transmitting and detecting portion of one embodiment of a heterodyne, bipolarized, differential mode interferometry (LDI), remote sensing system which uses a single photodetector.
FIG. 8 is a block diagram of the electronic stages of the embodiment of the laser Doppler radar remote sensing system of FIG. 7.

Referring now to FIG. 7, the figure shows a simplified "top view" optical block diagram of a differential mode LDI remote sensing system which does not use reference signals in the optical heterodyning process and has a single photodetector channel. As described previously in a preferred embodiment, a single laser may be used to provide a linearly polarized beam which is shifted by a quarter-wave plate to obtain a circularly polarized sensing beam. The sensing beam may then be directed by a beam steering and control system to illuminate an array retroreflector apparatus (target).

The return beam, containing the return sensing signals, is detected by the return beam control and steering system. The return beam is then passed to polarizing beamsplitter 86 which separates the return beam into a first return signal (a vertically polarized signal) and a second return signal (a horizontally polarized signal). The beamsplitter 86 in this orientation deflects the first return signal into a mirror. The mirror directs the first return signal into a Bragg cell.

In this embodiment, since the second return signal is not substantially stronger than the first return signal, the use of cascaded Bragg cells may not be necessary to reduce the Bragg cell leakage signal. The Bragg cell oscillator shifts the frequency of the impinging first return signal by 40 MHz. The frequency shifted first return signal is then reflected off a mirror into nonpolarizing beamsplitter 88 which also acts as a beam combiner. A portion of the frequency shifted first return signal is deflected by the nonpolarizing beamsplitter 88 into a lens. The deflected portion of the first return signal is focused by the lens onto a photodiode.

Referring again to polarizing beamsplitter 86, the second return signal passes through the polarizing beamsplitter 86 and enters a quarter-wave plate. The quarter-wave plate changes the polarity of the second return signal from horizontal polarization to vertical polarization. A portion of the second return signal then passes through nonpolarizing beamsplitter 88 (acting as a beam combiner) into the lens. The lens focuses the second return signal such that it overlaps the frequency shifted first return signal on the photodiode.

Both of the signals on the photodiode (photodetector) are now vertically polarized so optical heterodyning may take place at the photodiode. The output of the photodiode is a plurality of radio frequency (RF) signals (product signals) whose strength is proportional to the intensity of the incident light (the two return signals). The desired product signal from the photodiode of this embodiment has a carrier frequency which is the difference frequency between the second return signal and the frequency shifted first return signal. In this embodiment, the photodiode difference frequency is 40 MHz for the RF signal from the photodiode. This is the frequency shift placed on the first return signal by the Bragg cell. The RF signal from the photodiode has the array signal Doppler shifted frequency components centered about the carrier frequency of 40 MHz. The changing of the polarity of the second return signal by the quarter-wave plate into a vertically polarized signal enabled optical heterodyning to take place so that the common modulation components (common mode signals) of the two sensing signals would cancel in the photodetector; thus, common modulation components, such as, atmospheric turbulence, laser jitter, and in-line radar transmitter and target motion, are eliminated at the photodetector in this embodiment and a frequency modulated difference signal which represents the array signal remains.

FIG. 8 is a block diagram of the electronic stages of an embodiment which may be used in obtaining a seismic signal for the RF signal produced by the photodetector of FIG. 7. The RF signal is amplified, then passed thorough a 40 MHz filter with a bandpass of 250 kHz on each side of the center frequency of the filter. The signal is then FM demodulated to provide a time varying signal representative of the velocity of the ground motions detected by the geophones at the detector station. This signal may then be amplified and filtered to provide a seismic trace, which in this example is a seismic signal which the array signal.

While several embodiments of the invention have been shown and described, it will be understood that the invention is not limited thereto since many modifications may be made and will become apparent to those of skill in the art.

What is claimed is:

1. A remote detector apparatus adapted to provide a single return beam having two transversely polarized overlapping sensing signals, the signals having between them a difference signal which represents an electrical signal produced at a selected location, said signals enabling a bipolarized, differential mode, laser differential interferometry, remote sensing system to detect the electrical signal, to cancel common mode signals on the return sensing signals and to reduce turbulent noise on the difference signal, the turbulent noise being caused by atmospheric effects between a receiver of the system and said remote detector apparatus, the remote detector apparatus comprising:

a casing, the casing being functional to couple,, motions at the selected location, the motions having directions of movements in any of three orthogonal directions at the selected location; and a first means mounted on the casing which is functional for converting a single sensing beam into a single return beam (a) by splitting and (b) polarizing the sensing beam to form two polarized sensing signals, (c) by frequency modulating both of the polarized sensing signals to contain Doppler shifted frequency components that represent common motions coupled to the casing, (d) by frequency modulating one of the sensing signals with the electrical signal, the electrical signal being coupled to said first means by a second means for coupling the electrical signal to said first means, whereby, the two polarized sensing signals contain a difference signal between them which represents the electrical signal , (e) by combining the two polarized sensing signals to form the return beam, and (f) by directing the return beam to a return propagation path which takes the return beam to the receiver, the return beam having two transversely polarized return sensing signals which overlap each other on the return propagation path such that the two return sensing signals occupy substantially the same air space, whereby the atmospheric effects on the sensing beam and the overlapping return sensing signals result in turbulent noise on the single sensing beam and the single return beam which are common mode signals to both said return sensing signals thus reducing the effects of turbulent noise on the difference signal.

2. The remote detector apparatus in accordance with claim 1, wherein the first means for converting the sensing beam into the single return beam includes:

a nonpolarizing beamsplitter attached to the casing, the beamsplitter being functional (a) to split the sensing beam into a first sensing signal and a second sensing signal, (b) to deflect the first sensing signal into a different path than the path of the second sensing signal, and (c) to frequency modulate the first sensing signal by Doppler shifting the first sensing signal to contain a first grouping of frequency components which represents some of the motions coupled to the beamsplitter through the casing, the casing motions represented in the first grouping of frequency components having directions of movements which are inline with the paths of the first and second sensing signal;

polarizers, a first polarizer aligned with the first sensing signal path being functional to provide a first polarized signal from the first sensing signal and a second polarizer being aligned with the second sensing signal path and being functional to provide a second polarized signal from the second sensing signal, the polarizers being aligned with respect to each other such that the first polarized signal has a polarity which is orthogonal to the polarity of the second polarized signal;

a transducer, said second means for coupling the electrical signal to said first means including the transducer, the transducer being attached to the casing and being functional to transform the electrical signal into transducer motions having directions of movements which are inline with the path of the first sensing signal, said transducer motions being representative of the electrical signal;

a first retroreflector, the first retroreflector is attached to the transducer such that it is aligned with the path of the first sensing signal and it is also coupled to the casing through the transducer, the first retroreflector being functional to reflect the first polarized signal back into the beamsplitter and to move in repose to the transducer motions and to the motions on the casing, the movement of the first retroreflector thereby frequency modulating the first polarized sensing signal by Doppler shifting the first grouping of frequency components on said signal into a second grouping of frequency components which includes the effects of the first retroreflector's inline motions along the path of the first sensing signal;

a second retroreflector, the second retroreflector is attached to the casing and aligned with the path of the second sensing signal, the second retroreflector being functional to reflect the second polarized signal back into the beamsplitter and to move in response to the motions on the casing, the movement of the second retroreflector thereby frequency modulating the second polarized signal by Doppler shifting the second polarized signal to contain frequency components which represent the second retroreflector's inline motions along the path of the second sensing signal;

the nonpolarizing beamsplitter also being functional to provide a first return sensing signal from a portion of the reflected first polarized signal when the signal returns to the beamsplitter by splitting said portion from the reflected first polarized signal and by deflecting and frequency modulating said portion so that the first return sensing signal formed by the beamsplitter from said portion has (a) a direction of propagation opposite to the sensing beam, (b) a first return propagation path centered approximately on an incident path of the sensing beam into the beamsplitter, and (c) a third grouping of frequency components, whereby the third grouping of frequency components is formed by the beamsplitter Doppler shifting the second grouping of frequency components of said portion into the third grouping of frequency components, the third grouping of frequency components representing the electrical signal and a cumulative Doppler shift for the beamsplitter's inline motions along the path of the second sensing signal; and the nonpolarizing beamsplitter, in addition, being functional to provide a second return sensing signal when the reflected second polarized signal returns to the beamsplitter by splitting the reflected second polarized signal into a deflected second polarized signal and a second return sensing signal, the second return sensing signal having a propagation path which is the same as the first return propagation path, the first return sensing signal and the second return sensing signal being combined in the beamsplitter to form the return beam, whereby the common motions represented by the frequency components on the return sensing signals are the casing motions having directions of movements which are inline with the path of the second sensing signal and the difference signal between the two sensing signals represents the electrical signal.

3. The remote sensing apparatus according to claim 2, wherein:

the beamsplitter is aligned with the propagation path of the sensing beam, such that, when the beamsplitter is illuminated by the sensing beam, the path of the first sensing signal is deflected so that its path is approximately perpendicular to the path of the second sensing signal.

4. The remote detector apparatus in accordance with claim 3, wherein:

the first retroreflector is a corner-cube retroreflector; and the second retroreflector is a corner-cube retroreflector.

5. The remote detector apparatus in accordance with claim 4, wherein:

the beamsplitter is a wire grid polarizer; and the polarizers are wire grid polarizers.

6. The remote detector apparatus in accordance with claim 4, wherein the motions coupled to the casing are ground motions and wind motions.

7. The remote detector apparatus in accordance with claim 6, wherein the selected location is a detector station and the electrical signal is an array signal.

8. The remote detector apparatus in accordance with claim 7, also including:

an array of connected geophones forming the detector station, said connected geophones being connected with cable, the cable also connecting the array to the transducer, the array being functional to provide a combined electrical signal representative of seismic motions detected by said geophones, the combined electrical signal being the array signal.

9. The remote detector apparatus in accordance with claim 8, also including:

an amplifier;

wherein the amplifier is connected to the array by the cable and the cable also connects the amplifier to the transducer, the amplifier being functional to amplify the combined electrical signal to produce an amplified array signal, the amplified array signal being the electrical signal.

10. The remote detector apparatus in accordance with claim 4, also including:

an array of connected seismic detectors forming an array at the selected location, said connected seismic detectors being connected with cable, the cable also connecting the array to the transducer, the array being functional to produce a combined electrical signal representative of seismic motions detected by said seismic detectors, the combined electrical signal being an array signal, the array signal being the electrical signal coupled to the transducer by the cable.

11. The remote detector apparatus in accordance with claim 10 wherein the seismic detectors include hydrophones.

12. The remote detector apparatus in accordance with claim 10 wherein the seismic detectors include geophones.

13. The remote detector apparatus in accordance with claim 10, also including:

an amplifier;

wherein the amplifier is connected to the array by the cable and the cable also connects the amplifier to the transducer, the amplifier being functional to amplify the combined electrical signal to produce an amplified array signal, the amplified array signal being the electrical signal.

14. The remote detector apparatus in accordance with claim 13 wherein the seismic detectors include hydrophones.

15. The remote detector apparatus in accordance with claim 14 wherein the motions on the casing are wave motions.

16. The remote detector apparatus in accordance with claim 13 wherein the seismic detectors include geophones.

17. The remote detector apparatus in accordance with claim 4, also including:
 a side window on the casing;
 wherein, the beamsplitter is also aligned with respect to the side window so that when the beamsplitter is illuminated through the side window by the sensing beam, the beamsplitter is functional to deflect the first sensing signal in a vertical direction such that the path of this signal is along a vertical ordinate and the path of the second sensing signal is along a horizontal-inline ordinate.

18. The remote detection apparatus in accordance with claim 17 wherein:
 the beamsplitter is a wire grid polarizer; and
 the polarizers are wire grid polarizers.

19. The remote detector apparatus in accordance with claim 4, also including:
 a top window on the casing;
 wherein, the beamsplitter is also aligned with respect to the top window so that when the beamsplitter is illuminated through the top window by the sensing beam, the beamsplitter is functional to deflect the first sensing signal in a horizontal-inline direction such that the path of this signal is along a horizontal-inline ordinate and the path of the second sensing signal is along a vertical ordinate.

20. The remote detector apparatus in accordance with claim 1, wherein the first means for converting the sensing beam into the single return beam:
 a polarizing beamsplitter attached to the casing, the beamsplitter being functional (a) to split the sensing beam into two polarized sensing signals, a first sensing signal and a second sensing signal, the polarity of the first sensing signal being orthogonal to the polarity of the second sensing signal, the polarizing beam splitter also being functional (b) to deflect the first sensing signal into a different path than the path of the second sensing signal and (c) to frequency modulate the first sensing signal by Doppler shifting the first sensing signal to contain a first grouping of frequency components which represents some of the motions coupled to the beamsplitter through the casing, the casing motions represented in the first grouping of frequency components having directions of movements which are inline with the paths of the first and second sensing signal;
 a transducer, the second means for coupling the electrical signal to said first means includes the transducer, the transducer being attached to the casing and being functional to transform the electrical signal into transducer motions having directions of movements which are inline with the path of the first sensing signal, said transducer motions being representative of the electrical signal;
 a first retroreflector, the first retroreflector is attached to the transducer such that it is aligned with the path of the first sensing signal and it is also coupled to the casing through the transducer, the first retroreflector being functional to reflect the first sensing signal back into the beamsplitter and to move in repose to the transducer motions and to the motions on the casing, the movement of the first retroreflector thereby frequency modulating the first sensing signal by Doppler shifting the first grouping of frequency components into a second grouping of frequency components which includes the effects of the first retroreflector's inline motions along the path of the first sensing signal;
 a second retroreflector, the second retroreflector is attached to the casing and aligned with the path of the second sensing signal, the second retroreflector being functional to reflect the second sensing signal back into the beamsplitter and to move in response to the motions on the casing, the movement of the second retroreflector thereby frequency modulating the second sensing signal by Doppler shifting the second signal to contain frequency components which represent the second retroreflector's inline motions along the path of the second sensing signal, the reflected second sensing signal being a second return sensing signal when it returns within the polarizing beamsplitter, the second return sensing signal having a second return propagation path;
 the polarizing beamsplitter also being functional to provide a first return sensing signal from the reflected first sensing signal when the signal returns to the beamsplitter by deflecting and frequency modulating said reflected signal so that the first return sensing signal formed by the beamsplitter from said reflected signal has (a) a direction of propagation opposite to the sensing beam, (b) a first return propagation path centered approximately on an incident path of the sensing beam into the beamsplitter and having the same propagation path as the second return propagation path, and (c) a third grouping of frequency components, whereby the third grouping of frequency components is formed by the beamsplitter Doppler shifting the second grouping of frequency components into the third grouping of frequency components, the third grouping of frequency components representing the electrical signal and a cumulative Doppler shift for the beamsplitter's inline motions along the path of the second sensing signal; and
 the polarizing beamsplitter, in addition, being functional to combine the first return sensing signal and the second return sensing signal to form the return beam, whereby the common motions represented by the frequency components on the return sensing signals are the casing motions having directions of movements which are inline with the path of the second sensing signal and the difference signal between the two sensing signals represents the electrical signal.

21. The remote detector apparatus in accordance with claim 20, wherein:
 the beamsplitter is aligned with the propagation path of the sensing beam, such that, when the beamsplitter is illuminated by the sensing beam, the path of the first sensing signal is deflected so that its path is approximately perpendicular to the path of the second sensing signal.

22. The apparatus for converting a sensing beam according to claim 21, wherein:
 the first retroreflector is a corner-cube retroreflector; and
 the second retroreflector is a corner-cube retroreflector.

23. The apparatus for converting a sensing beam according to claim 22, wherein the motions coupled to the casing are ground motions and wind motions.

24. The apparatus for converting a sensing beam according to claim 23, wherein the selected location is a detector station and the electrical signal is an array signal.

25. The apparatus for converting a sensing beam according to claim 24, also including:
  an array of connected geophones forming the detector station, said connected geophones being connected with cable, the cable also connecting the array to the transducer, the array being functional to provide a combined electrical signal representative of seismic motions detected by said geophones, the combined electrical signal being the array signal, the array signal being the electrical signal.

26. The apparatus for converting a sensing beam according to claim 25, also including:
  an amplifier;
  wherein the amplifier is connected to the array by the cable and the cable also connects the amplifier to the transducer, the amplifier being functional to amplify the combined electrical signal to produce an amplified array signal, the amplified array signal being the electrical signal.

27. The remote detector apparatus in accordance with claim 22, also including:
  an array of connected seismic detectors forming an array at the selected location, said connected seismic detectors being connected with cable, the cable also connecting the array to the transducer, the array being functional to produce a combined electrical signal representative of seismic motions detected by said seismic detectors, the combined electrical signal being an array signal, the array signal being the electrical signal coupled to the transducer by the cable.

28. The remote detector apparatus in accordance with claim 27 wherein the seismic detectors include hydrophones.

29. The remote detector apparatus in accordance with claim 27 wherein the seismic detectors include geophones.

30. The remote detector apparatus in accordance with claim 27, also including:
  an amplifier;
  wherein the amplifier is connected to the array by the cable and the cable also connects the amplifier to the transducer, the amplifier being functional to amplify the combined electrical signal to produce an amplified array signal, the amplified array signal being the electrical signal.

31. The remote detector apparatus in accordance with claim 30 wherein the seismic detectors include hydrophones.

32. The remote detector apparatus in accordance with claim 31 wherein the motions on the casing are wave motions.

33. The remote detector apparatus in accordance with claim 30 wherein the seismic detectors include geophones.

34. The remote detector apparatus in accordance with claim 22, also including:
  a side window on the casing;
  wherein, the beamsplitter is also aligned with respect to the side window so that when the beamsplitter is illuminated through the side window by the sensing beam, the beamsplitter is functional to deflect the first sensing signal in a vertical direction such that the path of this signal is along a vertical ordinate and the path of the second sensing signal is along a horizontal-inline ordinate.

35. The remote detector apparatus in accordance with claim 22, also including:
  a top window on the casing;
  wherein, the beamsplitter is also aligned with respect to the top window so that when the beamsplitter is illuminated through the top window by the sensing beam, the beamsplitter is functional to deflect the first sensing signal in a horizontal-inline direction such that the path of this signal is along a horizontal-inline ordinate and the path of the second sensing signal is along a vertical ordinate.

36. The remote detector apparatus in accordance with claim 1, wherein the first means for converting the sensing beam into the single return beam includes:
  a transducer, the second means for coupling the electrical signal to the first means includes the transducer, the transducer being attached to the casing and being functional to transform the electrical signal into transducer motions having directions of movements which are inline with the path of a first sensing signal, said transducer motions being representative of the electrical signal;
  a polarizing beamsplitter attached to the transducer and coupled through the transducer to motions on the casing, the beamsplitter being functional (a) to split the sensing beam into two polarized sensing signals, the first sensing signal and a second sensing signal, the polarity of the first sensing signal being orthogonal to the polarity of the second sensing signal, the beamsplitter also being functional (b) to deflect the first sensing signal into a different path than the path of the second sensing signal and (c) to move in response to the transducer motions and to the motions on the casing, the polarizing beamsplitter thereby frequency modulating the first sensing signal by Doppler shifting the first sensing signal to contain a first grouping of frequency components which represents some of the motions coupled to the beamsplitter through the casing and the transducer motions, the casing motions represented in the first grouping of frequency components having directions of movements which are inline with the paths of the first and second sensing signal;
  a first retroreflector, the first retroreflector is attached to the casing such that it is aligned with the path of the first sensing signal, the first retroreflector being functional to reflect the first sensing signal back into the beamsplitter and to move in repose to the motions on the casing, the movement of the first retroreflector thereby frequency modulating the first sensing signal by Doppler shifting the first grouping of frequency components into a second grouping of frequency components which includes the effects of the first retroreflector's inline motions along the path of the first sensing signal
  a second retroreflector, the second retroreflector is attached to the casing and aligned with the path of the second sensing signal, the second retroreflector being functional to reflect the second sensing signal back into the beamsplitter and to move in response to the motions on the casing, the movement of the second retroreflector thereby frequency modulating the second sensing signal by Doppler shifting the second signal to contain frequency components which represent the second retroreflector's inline motions along the path of the second sensing signal, the reflected second sensing signal being a second return sensing signal when it returns within the polarizing beamsplitter, the second return sensing signal having a second return propagation path;

the polarizing beamsplitter also being functional to provide a first return sensing signal from the reflected first sensing signal when the signal returns to the beamsplitter by deflecting and frequency modulating said reflected signal so that the first return sensing signal formed by the beamsplitter from said reflected signal has (a) a direction of propagation opposite to the sensing beam, (b) a first return propagation path centered approximately on an incident path of the sensing beam into the beamsplitter and having the same propagation path as the second return propagation path, and (c) a third grouping of frequency components, whereby the third grouping of frequency components is formed by the beamsplitter Doppler shifting the second grouping of frequency components into the third grouping of frequency components, the third grouping of frequency components representing the electrical signal and a cumulative Doppler shift for the beamsplitter's inline motions along the path of the second sensing signal; and the polarizing beamsplitter, in addition, being functional to combine the first return sensing signal and the second return sensing signal to form the return beam, whereby the common motions represented by the frequency components on the return sensing signals are the casing motions having directions of movements which are inline with the path of the second sensing signal and the difference signal between the two sensing signals represents the electrical signal.

37. The remote detector apparatus in accordance with claim 36, wherein:
the beamsplitter is aligned with the propagation path of the sensing beam, such that, when the beamsplitter is illuminated by the sensing beam, the path of the first sensing signal is deflected so that its path is approximately perpendicular to the path of the second sensing signal.

38. The remote detector apparatus in accordance with claim 37, wherein:
the first retroreflector is a corner-cube retroreflector; and
the second retroreflector is a corner-cube retroreflector.

39. The remote detector apparatus in accordance with claim 38, wherein the motions coupled to the casing are ground motions and wind motions.

40. The remote detector apparatus in accordance with claim 39, wherein the selected location is a detector station and the electrical signal is an array signal.

41. The remote detector apparatus in accordance with claim 40, also including:
an array of connected geophones forming the detector station, said connected geophones being connected with cable, the cable also connecting the array to the transducer, the array being functional to provide a combined electrical signal representative of seismic motions detected by said geophones, the combined electrical signal being the array signal.

42. The remote detector apparatus in accordance with claim 41, also including:
an amplifier;
wherein the amplifier is connected to the array by the cable and the cable also connects the amplifier to the transducer, the amplifier being functional to amplify the combined electrical signal to produce an amplified array signal.

43. The remote detector apparatus in accordance with claim 38, also including:
an array of connected seismic detectors forming an array at the selected location, said connected seismic detectors being connected with cable, the cable also connecting the array to the transducer, the array being functional to produce a combined electrical signal representative of seismic motions detected by said seismic detectors, the combined electrical signal being an array signal, the array signal being the electrical signal coupled to the transducer by the cable.

44. The remote detector apparatus in accordance with claim 43 wherein the seismic detectors include hydrophones.

45. The remote detector apparatus in accordance with claim 43 wherein the seismic detectors include geophones.

46. The remote detector apparatus in accordance with claim 43, also including:
an amplifier;
wherein the amplifier is connected to the array by the cable and the cable also connects the amplifier to the transducer, the amplifier being functional to amplify the combined electrical signal to produce an amplified array signal, the amplified array signal being the electrical signal.

47. The remote detector apparatus in accordance with claim 46 wherein the seismic detectors include hydrophones.

48. The remote detector apparatus in accordance with claim 47 wherein the motions on the casing are wave motions.

49. The remote detector apparatus in accordance with claim 46 wherein the seismic detectors include geophones.

50. The apparatus for converting a sensing beam according to claim 38, also including:
a side window on the casing;
wherein, the beamsplitter is also aligned with respect to the side window so that when the beamsplitter is illuminated through the side window by the sensing beam, the beamsplitter is functional to deflect the first sensing signal in a vertical direction such that the path of this signal is along a vertical ordinate and the path of the second sensing signal is along a horizontal-inline ordinate.

51. The apparatus for converting a sensing beam into a return beam in accordance with claim 1, wherein the first means for converting the single sensing beam into a single return beam includes:
a transducer, the second means for coupling the electrical signal to the first means includes the transducer, the transducer being attached to the casing and being functional to transform the electrical signal into transducer motions having directions of movements which are inline with the path of a first sensing signal, said transducer motions being representative of the electrical signal;

a nonpolarizing beamsplitter attached to the transducer and coupled through the transducer to motions on the casing, the beamsplitter being functional (a) to split the sensing beam into a first sensing signal and a second sensing signal, the beamsplitter also being functional (b) to deflect the first sensing signal into a different path than the path of the second sensing signal and (c) to move in response to the transducer motions and to the motions on the casing, the nonpolarizing beamsplitter thereby frequency modulating the first sensing signal by Doppler shifting the first sensing signal to contain a first grouping of frequency components which represents some of the motions coupled to the beamsplitter through the casing and the transducer motions, the casing motions represented in the first grouping of frequency components having directions of movements which are inline with the paths of the first and second sensing signal;

polarizers, a first polarizer aligned with the first sensing signal and being functional to provide a first polarized signal from the first sensing signal and a second polarizer being aligned with the second sensing signal and being functional to provide a second polarized signal from the second sensing signal, the polarizers being aligned with respect to each other such that the first polarized signal has a polarity which is orthogonal to the polarity of the second polarized signal;

a first retroreflector, the first retroreflector is attached to the casing such that it is aligned with the path of the first sensing signal, the first retroreflector being functional to reflect the first polarized sensing signal back into the beamsplitter and to move in repose to the motions on the casing, the movement of the first retroreflector thereby frequency modulating the first sensing signal by Doppler shifting the first grouping of frequency components into a second grouping of frequency components which includes the effects of the first retroreflector's inline motions along the path of the first sensing signal;

a second retroreflector, the second retroreflector is attached to the casing and aligned with the path of the second sensing signal, the second retroreflector being functional to reflect the second polarized sensing signal back into the beamsplitter and to move in response to the motions on the casing, the movement of the second retroreflector thereby frequency modulating the second sensing signal by Doppler shifting the second polarized signal to contain frequency components which represent the second retroreflector's inline motions along the path of the second sensing signal;

the nonpolarizing beamsplitter also being functional to provide a first return sensing signal from a portion of the reflected first polarized signal when the signal returns to the beamsplitter by splitting said portion from the reflected first polarized signal and by deflecting and frequency modulating said portion so that the first return sensing signal formed by the beamsplitter from said portion has (a) a direction of propagation opposite to the sensing beam, (b) a first return propagation path centered approximately on an incident path of the sensing beam into the beamsplitter, and (c) a third grouping of frequency components, whereby the third grouping of frequency components is formed by the beamsplitter Doppler shifting the second grouping of frequency components of said portion into the third grouping of frequency components, the third grouping of frequency components representing the electrical signal and a cumulative Doppler shift for the nonpolarizing beamsplitter's inline motions along the path of the second sensing signal; and the nonpolarizing beamsplitter, in addition, being functional to provide a second return sensing signal when the reflected second polarized signal returns to the beamsplitter by splitting the reflected second polarized signal into a deflected second polarized signal and a second return sensing signal, the second return sensing signal having a second return propagation path which is the same as the first return propagation path, the first return sensing signal and the second return sensing signal being combined in the beamsplitter to form the return beam, whereby the common motions represented by the frequency components on the return sensing signals are the casing motions having directions of movements which are inline with the path of the second sensing signal and the difference signal between the two sensing signals represents the electrical signal.

52. The remote detector apparatus in accordance with claim 51, wherein:
the nonpolarizing beamsplitter is aligned with the propagation path of the sensing beam, such that, when the beamsplitter is illuminated by the sensing beam, the path of the first sensing signal is deflected so that its path is approximately perpendicular to the path of the second sensing signal.

53. The remote detector apparatus in accordance with claim 52, wherein:
the first retroreflector is a corner-cube retroreflector; and
the second retroreflector is a corner-cube retroreflector.

54. The remote detector apparatus in accordance with claim 53, wherein:
the beamsplitter is a wire grid polarizer; and
the polarizers are wire grid polarizers.

55. The remote detector apparatus in accordance with claim 53, wherein the motions coupled to the casing are ground motions and wind motions.

56. The remote detector apparatus in accordance with claim 55, wherein the selected location is a detector station and the electrical signal is an array signal.

57. The remote detector apparatus in accordance with claim 56, also including:
an array of connected geophones forming the detector station, said connected geophones being connected with cable, the cable also connecting the array to the transducer, the array being functional to provide a combined electrical signal representative of seismic motions detected by said geophones, the combined electrical signal being the array signal.

58. The remote detector apparatus in accordance with claim 57, also including:
an amplifier;
wherein the amplifier is connected to the array by the cable and the cable also connects the amplifier to the transducer, the amplifier being functional to amplify the combined electrical signal to produce an amplified array signal.

59. The remote detector apparatus in accordance with claim 53, also including:
an array of connected seismic detectors forming an array at the selected location, said connected seismic detectors being connected with cable, the cable also connecting the array to the transducer, the array being functional to produce a combined electrical signal representative of seismic motions detected by said seismic detectors, the combined electrical signal being an array signal, the array signal being the electrical signal coupled to the transducer by the cable.

60. The remote detector apparatus in accordance with claim 59 wherein the seismic detectors include hydrophones.

61. The remote detector apparatus in accordance with claim 59 wherein the seismic detectors include geophones.

62. The remote detector apparatus in accordance with claim 59, also including:
an amplifier;
wherein the amplifier is connected to the array by the cable and the cable also connects the amplifier to the transducer, the amplifier being functional to amplify the combined electrical signal to produce an amplified array signal, the amplified array signal being the electrical signal.

63. The remote detector apparatus in accordance with claim 62 wherein the seismic detectors include hydrophones.

64. The remote detector apparatus in accordance with claim 63 wherein the motions on the casing are wave motions.

65. The remote detector apparatus in accordance with claim 62 wherein the seismic detectors include geophones.

66. The remote detector apparatus in accordance with claim 53, also including:
a side window on the casing;
wherein, the beamsplitter is also aligned with respect to the side window so that when the beamsplitter is illuminated through the side window by the sensing beam, the beamsplitter is functional to deflect the first sensing signal in a vertical direction such that the path of this signal is along a vertical ordinate and the path of the second sensing signal is along a horizontal-inline ordinate.

67. A method for producing a single return beam having two transversely polarized, overlapping, return sensing signals, said signals having a difference signal between them which represents an electrical signal produced at a selected location, said return beam enabling a bipolarized, differential mode, laser differential interferometry, remote sensing system, to detect the electrical signal, said overlapping return sensing signals also enabling the remote sensing system to reduce turbulent noise on the difference signal, the turbulent noise being caused by atmospheric effects between a receiver of the remote sensing system and the selected location, the method comprising the steps of:
(a) transmitting a single sensing beam to the selected location;
(b) coupling motions at the remote location to a casing, the motions being in any of three orthogonal directions;
(c) separating two polarized sensing signals from the sensing beam, the polarities of the polarized sensing signals being orthogonal to each other, the polarized sensing signals having separate paths;
(d) Doppler shifting both of the polarized sensing signals with common motions coupled to the casing such that each of the two polarized sensing signals contains frequency components which represent the same common motions;
(e) transforming the electrical signal into movements which are inline with the path of one of the two polarized sensing signals, the movements representing the electrical signal;
(f) Doppler shifting a polarized sensing signal of the two polarized sensing signals, the signal having the path inline with the movements representing the electrical motions such the signal has Doppler shifted frequency components which represent the electrical signal;
(g) combining the two Doppler shifted polarized sensing signals to form a return beam having a return propagation path to the receiver of the sensing system, the return beam having two transversely polarized return sensing signals which overlap each other on the return propagation path such that the two return sensing signals occupy substantially the same airspace, the two return sensing signals having a difference signal between them that represents the electrical signal.

68. The method for producing the single return beam according to claim 67, wherein:
step (c) also includes, separating the beam into a first polarized sensing signal and a second polarized sensing signal and deflecting the first polarized sensing signal to a path that is approximately perpendicular to the path of the second polarized sensing signal;
step (d) also includes, a first Doppler shifting of the first polarized sensing signal with the common motions as said signal is deflected in step (c), reflecting the first polarized sensing signal back along its path, deflecting the first polarized sensing signal to a return propagation path, and a second Doppler shifting of the first polarized sensing signal with the common motions as the signal is deflected to the return propagation path, reflecting the second polarized sensing signal back along its path and Doppler shifting the second polarized sensing signal with the common motions as it is being reflected, the reflected path of the second polarized sensing signal being aligned with the return propagation path; and
step (f) also includes, reflecting the first polarized sensing signal and Doppler shifting the first polarized sensing signal with the movements representing the electrical signal as the signal is being reflected in step (d).

69. The method for producing the single return beam according to claim 67, wherein:
step (c) also includes, separating the beam into a first polarized sensing signal and a second polarized sensing signal and deflecting the first polarized sensing signal to a path that is approximately perpendicular to the path of the second polarized sensing signal;
step (d) also includes, a first Doppler shifting of the first polarized sensing signal with the common motions as said signal is deflected in step (c), reflecting the first polarized sensing signal back along its path, deflecting the first polarized sensing signal to a return propagation path, and a second Doppler shifting of the first polarized sensing signal with the common motions as the signal is deflected to the return propagation path, reflecting the second polarized sensing signal back along its path and Doppler shifting the second polarized sensing signal with the common motions as it is being reflected, the reflected path of the second polarized sensing signal being aligned with the return propagation path; and step (f) also includes, Doppler shifting the first polarized sensing signal with the movements representing the electrical signal each time the first polarized sensing signal is deflected in step (d).

70. The method for producing a single return beam in accordance with claim 67, wherein:
step (e) also includes, producing the electrical signal from by combining the seismic signals from a plurality of seismic detectors connected in an array at the remote location.

71. A method for producing a single return beam having two transversely polarized, overlapping, return sensing signals, said signals having a difference signal between them which represents an electrical signal produced at a selected location, said return beam enabling a bipolarized, differential mode, laser differential interferometry, remote sensing system, to detect the electrical signal, said overlapping return sensing signals also enabling the remote sensing system to reduce turbulent noise on the difference signal, the turbulent noise being caused by atmospheric effects between a receiver of the remote sensing system and the selected location, the method comprising the steps of:
(a) transmitting a single sensing beam to the selected location;
(b) coupling motions at the remote location to a casing, the motions being in any of three orthogonal directions;
(c) separating two sensing signals from the sensing beam such that the two sensing signals have separate paths and polarizing the two sensing signals into two polarized sensing signals, the polarities of the polarized sensing signals being orthogonal to each other;
(d) Doppler shifting both of the sensing signals and both of the polarized sensing signals with common motions coupled to the casing such that each of the two polarized sensing signals contains frequency components which represent the same common motions;
(e) transforming the electrical signal into movements which are inline with the path of one of the two sensing signals, the movements representing the electrical signal;
(f) Doppler shifting a polarized sensing signal of the two polarized sensing signals, the signal having the path inline with the movements representing the electrical motions such that the signal has Doppler shifted frequency components which represent the electrical signal;
(g) combining the Doppler shifted polarized sensing signals to form a return beam having a return propagation path to the receiver of the sensing system, the return beam having two transversely polarized return sensing signals which overlap each other on the return propagation path such that the two return sensing signals occupy substantially the same airspace, the two return sensing signals having a difference signal between them that represents the electrical signal.

72. The method for producing the single return beam according to claim 71, wherein:
step (c) also includes, separating the beam into a first sensing signal and a second sensing signal and deflecting the first sensing signal to a path that is approximately perpendicular to the path of the second sensing signal;

step (d) also includes, a first Doppler shifting of the first sensing signal with the common motions as said signal is deflected in step (c), reflecting the first polarized sensing signal back along its path, deflecting the first polarized sensing signal to a return propagation path, and a second Doppler shifting of the first polarized sensing signal with the common motions as the signal is deflected to the return propagation path, reflecting the second polarized sensing signal back along its path and Doppler shifting the second polarized sensing signal with the common motions as it is being reflected, the reflected path of the second polarized sensing signal being aligned with the return propagation path; and step (f) also includes, reflecting the first polarized sensing signal and Doppler shifting the first polarized sensing signal with the movements representing the electrical signal as the signal is being reflected in step (d).

73. The method for producing the single return beam according to claim 71, wherein:
step (c) also includes, separating the beam into a first sensing signal and a second sensing signal and deflecting the first sensing signal to a path that is approximately perpendicular to the path of the second sensing signal;

step (d) also includes, a first Doppler shifting of the first sensing signal with the common motions as said signal is deflected in step (c), reflecting the first polarized sensing signal back along its path, deflecting the first polarized sensing signal to a return propagation path, and a second Doppler shifting of the first polarized sensing signal with the common motions as the signal is deflected to the return propagation path, reflecting the second polarized sensing signal back along its path and Doppler shifting the second polarized sensing signal with the common motions as it is being reflected, the reflected path of the second polarized sensing signal being aligned with the return propagation path; and step (f) also includes, Doppler shifting the first polarized sensing signal with the movements representing the electrical signal each time the first polarized sensing signal is deflected in step (d).

74. The method for producing a single return beam in accordance with claim 71, wherein:
step (e) also includes, producing the electrical signal from by combining the seismic signals from a plurality of seismic detectors connected in an array at the remote location.

75. A method for remotely obtaining a difference signal which is representative of an electrical signal produced at a selected location, comprising the steps of:
(a) producing a laser beam of substantially monochromatic frequency;

(b) splitting the laser beam into a sensing beam and a reference beam;

(c) changing the frequency of the reference beam to produce a frequency offset between the frequency of the sensing beam and the frequency of the reference beam;

(d) splitting the reference beam into two polarized reference signals, a first reference signal and a second reference signal, the polarity of the first reference signal being orthogonal to the polarity of the second reference signal;

(e) directing the sensing beam to the selected location;

(f) coupling motions at the selected location to a casing;

(g) converting the sensing beam at the casing into a return beam having two overlapping polarized return sensing signals, both of the return sensing signals having been frequency modulated to have common mode frequency components which represent common motions on the casing and to have a difference signal between the two signals which represents the electrical signal produced at the selected location, the polarities of the polarized return sensing signals being transversely aligned with respect to each other and the two return signals being aligned on the return signal such that the two signals occupy substantially the same air space on a return propagation path from the selected location;

(h) detecting the return beam;

(i) separating the two polarized return signals from the return beam into two separated polarized signals, a first return signal and a second return signal, the polarity of the first return signal being orthogonal to the polarity of the second return signal and having the same polarity as the first reference signal;

(j) combining in an optical heterodyning process the first reference signal with the first return signal and the second reference signal with the second return signal to produce a first channel signal and a second channel signal, each channel signal having a center frequency approximately at the offset frequency;

(k) reversing the polarity of either channel signal;

(l) canceling the common mode signals that were on the sensing beam and the return beam by combining the first channel signal and the second channel signal in a heterodyning process to produce a frequency modulated difference signal; and (m) demodulating the deference signal to produce a time varying signal which represents the electrical signal.

76. The method for obtaining a difference signal according to claim 75, wherein:

step (g) also includes, producing the electrical signal by combining seismic signals from a plurality of seismic detectors connected in an array at the remote location; and in step (m) the demodulation of the difference signal produces the time varying signal which represent the seismic trace of the combined seismic signals from the array.

77. An apparatus for remotely obtaining a difference signal which is representative of an electrical signal produced at a selected location, comprising:

a laser, the laser being functional for producing a laser beam of substantially monochromatic frequency;

a beamsplitter, the beamsplitter being functional for splitting the laser beam into a sensing beam and a reference beam;

a first Bragg cell, the Bragg cell being functional for changing the frequency of the reference beam to produce a frequency offset between the frequency of the sensing beam and the frequency of the reference beam;

a first polarizing beamsplitter, the first polarizing beamsplitter being functional for splitting the reference beam into two polarized reference signals, a first reference signal and a second reference signal, the polarity of the first reference signal being orthogonal to the polarity of the second reference signal;

a casing, the casing being functional to couple to motions at the selected location;

a means mounted on the casing which is functional for converting the sensing beam into a return beam having two overlapping transversely polarized return sensing signals, the two return sensing signals having been frequency modulated to contain common mode frequency components that represent common motions coupled to the casing and to have between the two signals a difference signal which represents the electrical signal produced at the selected location, the two return sensing signals being aligned on the return beam to overlap each other such that the two signals occupy substantially the same air space on a return path to a receiver;

a return beam detector, the return beam detector being functional for detecting the return beam;

a second polarizing beamsplitter, the second polarizing beamsplitter being functional for separating the two polarized return signals from the return beam into two separated polarized signals, a first return signal and a second return signal, the polarity of the first return signal being orthogonal to the polarity of the second return signal and having the same polarity as the first reference signal;

a first photodetector, the first photodetector being functional for combining in an optical heterodyning process the first reference signal with the first return signal to produce a first channel signal having a center frequency approximately at the frequency offset;

a second photodetector, the second photodetector being functional for combining in an optical heterodyning process the second reference signal with the second return signal to produce a second channel signal having a center frequency approximately at the frequency offset, the first channel signal and the second channel signal being channel signals;

an oscillator, the oscillator being functional to produce a signal having a frequency which can be heterodyned with one of the channel signals to produce a frequency shifted channel signal which has a polarity reversal with respect to an initial channel signal;

a means for combining the oscillator signal with said one of the channel signals to produce a polarity reversed channel signal;

a means for combining the polarity reversed channel signal with a channel signal of the channel signals which was not used to form the polarity reversed channel signal in a heterodyning process to cancel any common mode signals that were on the sensing beam and the return beam and to produce a frequency modulated difference signal which represents the electrical signal.

78. The apparatus for remotely obtaining the difference signal of claim 77, also including, an FM demodulator to produce a time varying signal which represents the electrical signal.

79. The apparatus for remotely obtaining the difference signal of claim 78, wherein:

the electrical signal is an array signal, the array signal being produced by combing seismic signals obtained from seismic detectors connected in an array at the remote location; and the time varying signal is a seismic trace which represents the combined seismic signals from the array.

80. A method for remotely obtaining a difference signal which is representative of an electrical signal produced at a selected location, comprising the steps of:

(a) producing a laser beam of substantially monochromatic frequency;

(b) directing the sensing beam to the selected location;

(c) coupling motions at the selected location to a casing;

(d) converting the sensing beam at the casing into a return beam having two overlapping polarized return sensing signals, both of the return sensing signals having been frequency modulated to have common mode frequency components which represent common motions on the casing and to have a difference signal between the two signals which represents the electrical signal produced at the selected location, the polarities of the polarized return sensing signals being transversely aligned with respect to each other and the two return signals being aligned on the return signal such that the two signals occupy substantially the same air space on a return propagation path from the selected location;

(e) detecting the return beam;

(f) separating the two polarized return signals from the return beam into two separated polarized signals, a first return signal and a second return signal, the polarity of the first return signal being orthogonal to the polarity of the second return signal and having the same polarity as the first reference signal (g) changing the frequency of the first return signal to produce a frequency offset between the frequency of the first return signal and the frequency of the second return signal;

(h) reversing the polarity of the second return signal;

(i) canceling any common mode signals on the sensing beam and the return beam by combining in an optical heterodyning process the first return signal with the second return signal to produce a channel signal, the optical heterodyning producing a frequency modulated difference signal which represents the electrical signal;

(j) demodulating the deference signal to produce a time varying signal which represents the electrical signal.

81. The method for obtaining a difference signal according to claim 80, wherein:

step (d) also includes, producing the electrical signal by connecting seismic detectors at the remote location in array and combining the seismic signals from the seismic detectors to form an array signal, the array signal being the electrical signal; and in step (j), the demodulation of the difference signal produces the time varying signal which represents a seismic trace of the combined seismic signal in the array.

82. An apparatus for remotely obtaining a difference signal which is representative of an electrical signal produced at a selected location, comprising:

a laser, the laser being functional for producing a laser beam of substantially monochromatic frequency;

a casing, the casing being functional to couple to motions at the selected location;

a means mounted on the casing which is functional for converting the sensing beam into a return beam having two overlapping transversely polarized return sensing signals, the two return sensing signals having been frequency modulated to contain common mode frequency components that represent common motions coupled to the casing and to have between the two signals a difference signal which represents the electrical signal produced at the selected location, the two return sensing signals being aligned on the return beam to overlap each other such that the two signals occupy substantially the same air space on a return path to a receiver;

a return beam detector, the return beam detector being functional for detecting the return beam;

a polarizing beamsplitter, the polarizing beamsplitter being functional for separating the two polarized return signals from the return beam into two separated polarized signals, a first return signal and a second return signal, the polarity of the first return signal being orthogonal to the polarity of the second return signal and having the same polarity as the first reference signal;

a means for changing the frequency of the first return signal to produce a frequency offset between the frequency of the first return signal and the second return signal;

a means for rotating the polarity of the second return signal such that it has the same polarity as the first return signal; and a photodetector, the photodetector being functional for combining in an optical heterodyning process the first return signal with the second return signal to cancel any common mode signals which were on the sensing beam and the return beam and to produce a channel signal having a center frequency approximately at the frequency offset, the channel signal being the frequency modulated difference signal which represents the electrical signal.

83. The apparatus for remotely obtaining a difference signal of claim 82, wherein the means for changing the frequency of the first return signal is a Bragg cell.

84. The apparatus for remotely obtaining a difference signal of claim 82, wherein the means for rotating the polarity of the second return signal is a quarter-wave plate.

85. The apparatus for remotely obtaining a difference signal of claim 82, wherein:

the electrical signal is an array signal, the array signal being produced by combing seismic signals obtained from seismic detectors connected in an array at the remote location; and the time varying signal is a seismic trace which represents the combined seismic signals from the array.

* * * * *